US011188831B2

United States Patent
Snyder et al.

(10) Patent No.: US 11,188,831 B2
(45) Date of Patent: Nov. 30, 2021

(54) ARTIFICIAL INTELLIGENCE SYSTEM FOR REAL-TIME VISUAL FEEDBACK-BASED REFINEMENT OF QUERY RESULTS

(71) Applicant: Amazon Technologies, Inc., Seattle, WA (US)

(72) Inventors: Benjamin Lev Snyder, Seattle, WA (US); Liliane Jeanne Barbour, Seattle, WA (US); Aritra Biswas, Madison, WI (US); Simone Elviretti, Seattle, WA (US); Rasika Sanjay Jangle, Seattle, WA (US); Paul Hercules Mandac Rivera, Seattle, WA (US); James Stevenson, Seattle, WA (US); Daniel Patrick Weaver, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1070 days.

(21) Appl. No.: 15/796,410

(22) Filed: Oct. 27, 2017

(65) Prior Publication Data
US 2019/0130285 A1   May 2, 2019

(51) Int. Cl.
| | |
|---|---|
| *G06N 5/02* | (2006.01) |
| *G06F 16/54* | (2019.01) |
| *G06Q 30/06* | (2012.01) |
| *G06F 16/904* | (2019.01) |
| *G06F 16/9038* | (2019.01) |
| *G06N 3/04* | (2006.01) |

(52) U.S. Cl.
CPC ............ *G06N 5/022* (2013.01); *G06F 16/54* (2019.01); *G06F 16/904* (2019.01); *G06F 16/9038* (2019.01); *G06N 3/04* (2013.01); *G06Q 30/0613* (2013.01); *G06Q 30/0631* (2013.01); *G06Q 30/0641* (2013.01)

(58) Field of Classification Search
None
See application file for complete search history.

(56) References Cited

U.S. PATENT DOCUMENTS

| | | |
|---|---|---|
| 6,169,986 B1 | 1/2001 | Bowman et al. |
| 6,772,150 B1 | 8/2004 | Whitman et al. |
| 7,165,080 B2 | 1/2007 | Kotcheff et al. |
| 7,756,855 B2 | 7/2010 | Ismalon |
| 7,890,526 B1 | 2/2011 | Brewer et al. |

(Continued)

OTHER PUBLICATIONS

Freund et al., An Efficient Boosting Algorithm for Combining Preferences, Journal of Machine Learning Research, 4, 2003, pp. 933-969 (Year: 2003).*

(Continued)

*Primary Examiner* — Alan Chen
(74) *Attorney, Agent, or Firm* — Robert C. Kowert; Kowert, Hood, Munyon, Rankin & Goetzel, P.C.

(57) ABSTRACT

In response to a programmatic interaction, respective representations of items of an initial result set are presented to an item consumer. One or more result refinement iterations are then conducted. In a given iteration, one or more feedback indicators with respect to one or more items are identified, a machine learning model is trained using at least the feedback indicators to generate respective result set candidacy metrics for at least some items, and the metrics are then used to transmit additional items for presentation to the item consumer.

20 Claims, 11 Drawing Sheets

(56) References Cited

U.S. PATENT DOCUMENTS

| | | |
|---|---|---|
| 8,019,748 B1 | 9/2011 | Wu et al. |
| 8,065,316 B1 | 11/2011 | Baker et al. |
| 8,577,911 B1 | 11/2013 | Stepinski et al. |
| 10,204,166 B2 * | 2/2019 | Petrescu ............. G06F 16/9535 |
| 10,361,802 B1 * | 7/2019 | Hoffberg-Borghesani .................. G11B 27/11 |
| 2002/0002502 A1 | 1/2002 | Maes et al. |
| 2007/0282811 A1 | 12/2007 | Musgrove |
| 2008/0140643 A1 | 6/2008 | Ismalon |
| 2010/0146012 A1 | 6/2010 | Beaudreau et al. |
| 2017/0091319 A1 | 3/2017 | Legrand et al. |

OTHER PUBLICATIONS

Tieu et al., Boosting Image Retrieval, International Journal of Computer Vision 56(1/2), 2004, pp. 17-36 (Year: 2004).*
Tong et al., Support Vector Machine Active Learning for Image Retrieval, ACM, 2001, pp. 107-118 (Year: 2001).*
U.S. Appl. No. 15/861,496, filed Jan. 3, 2018, Prashant Verma et al.
AWS, "Amazon Machine Learning Developer Guide Version Latest", Copyright 2017 Amazon Web Services, pp. 1-146.
International Search Report and Written Opinion from PCT/US2018/057108, dated Dec. 19, 2018, Amazon Technologies, Inc., pp. 1-10.

* cited by examiner

Identify a collection of items for which real-time query result set refinement is to be employed – e.g., items belonging to categories such as clothing, furniture etc., for which precise search terms are sometimes hard for consumers to articulate, and for which image-based selection is common   301

Generate, using a first machine learning model, a respective feature set (e.g., an embedding vector in a high-dimensional space, obtainable from a hidden layer of a deep neural network model used for image recognition applications) corresponding to each of the items   304

Identify, e.g., in response to a search query or some other programmatic interaction with a potential consumer of an item, an initial result set of items to be presented to a consumer   307

Cause images of the items of the initial result set to be displayed at a presentation device (e.g., a phone, tablet, AR/VR device, laptop, etc.) which supports real-time interactive feedback (e.g., by swiping, check-marks, gestures, utterance capture, etc.)   310

Consumer has finalized item choice, or other criteria (e.g., no-new-feedback) for terminating refinement analysis met? 313

Y → Conclude refinement iterations 399

N ↓

Start next real-time result set refinement iteration: collect and interpret set of implicit/explicit feedback signals or indicators (e.g., even before the consumer has finished viewing all the items identified thus far) 316

(Re-)train second machine learning model to generate result set candidacy scores of various items (e.g., predicted probabilities that the item is the one that the customer will choose); the training data includes (a) the interpreted feedback signals and (b) the feature sets of some subset or all of the items 319

Using output of second model, identify one or more additional items for presentation to the consumer, and transmit images of the additional items for inclusion in the images being presented to the consumer in real time (e.g., making it appear as though the additional items were identified in response to the original interaction with the consumer); the additional images may, for example, be appended, substituted or rearranged   322

*FIG. 3*

ARTIFICIAL INTELLIGENCE SYSTEM FOR REAL-TIME VISUAL FEEDBACK-BASED REFINEMENT OF QUERY RESULTS

BACKGROUND

Some large e-retail organizations may have inventories comprising millions of items. For some categories of items, such as books, electronic devices and the like, potential customers may typically be able to formulate fairly specific queries—e.g., the name of the author or the title of a book may be used to find a book, or the name of a laptop manufacturer and a size of the laptop screen may be used to find a laptop that the customer may be interested in purchasing.

For other types of items, such as furniture, clothing, jewelry, home accessories including carpets/rugs and the like, it may often be harder for customers to specify their preferences in precise language. In some cases, a customer looking for an item at an e-retail site may have a general idea of some desired properties of an item, but may not be able (at least initially) to provide sufficient details to map their preferences to the structured item metadata (such as name, description etc.) available at the e-retailer. Furthermore, names or labels given to the items by the item producers may be somewhat generic (e.g., "Red 8×6 foot woolen rug"), and often may not be as useful in narrowing down searches as, for example, book titles or author names are.

For the categories of items for which precise descriptions are hard to articulate, the decision as to which particular item a customer eventually purchases may often be based on exploring the available options visually (e.g., via images, videos etc. available at the e-retail web site) as best as possible. For many such categories of hard-to-specify items, the number of individual items available at a large e-retailer may be very large—e.g., the e-retailer's inventory may include tens of thousands of items a particular category. Enabling a potential item consumer to select a particular item that truly matches their needs from such large inventories, without exhausting the patience of the consumer during a given interaction session with the e-retailer's web site, may present a non-trivial technical challenge.

BRIEF DESCRIPTION OF DRAWINGS

FIG. 3 is a flow diagram illustrating aspects of operations that may be performed to refine item query results in real time, according to at least some embodiments.

Figure 1:
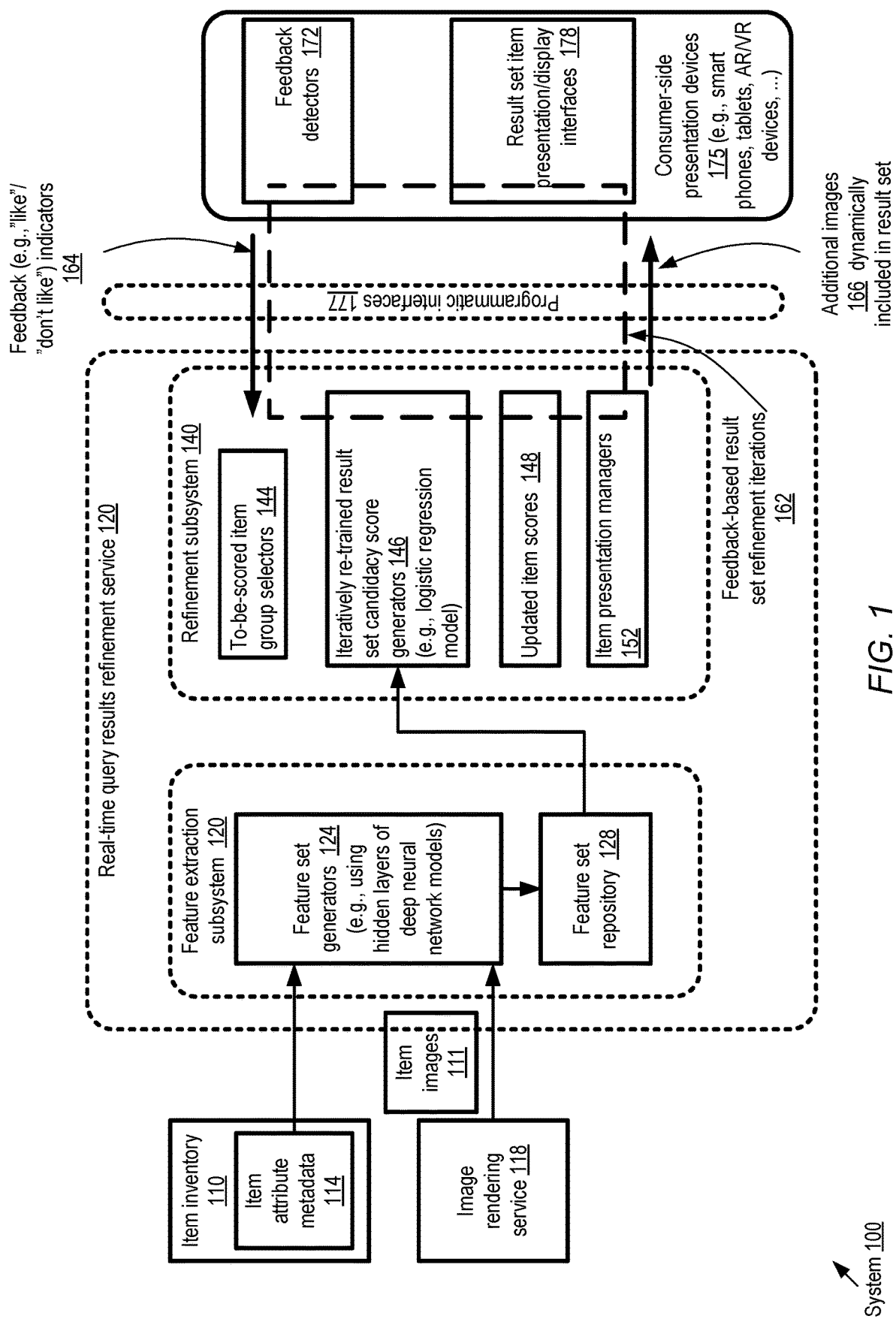
FIG. 1 illustrates an example system environment in which real-time refinement of query results based on visual feedback may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for iterative real-time refinement of query results pertaining to at least some types of items of an inventory, based on quickly re-training a machine learning model using interpreted feedback signals and re-scoring items using the re-trained model, are described. At a high level, in each refinement iteration, some number of items may be presented as candidates for satisfying an item consumer's needs, explicit or implicit feedback pertaining to at least a subset of the presented items may be gathered, and, using the feedback and a set of features which succinctly capture salient aspects of the inventory items, additional items may be identified as "better" candidates and quickly presented to the consumer. In at least some embodiments, in a given iteration, the model may be re-trained using a relatively small number (e.g., less than ten) of training examples derived from feedback signals (such as approval/disapproval touch-screen based gestures) provided by a potential item consumer, and thousands of items may then be re-scored very efficiently using the trained model. As such, multiple result refinement iterations may be implemented within a few seconds in some embodiments, with items that are predicted to be better suited to the consumer's needs being presented in a seamless sequence to the consumer as more feedback is received. Such an approach may result in making the overall experience of identifying an item that meets the consumer's needs much more enjoyable than may be possible using more static approaches. A variety of modalities may be used for the feedback in different embodiments—e.g., gestures captured using touch screens or augmented/virtual reality devices, vocal utterances and the like may be employed by the consumer to indicate approval or disapproval of individual items being presented.

A system or network-accessible service which generates refined or adapted query results in real-time may comprise at least two main subsystems in some embodiments: an off-line or background subsystem which is used primarily to generate feature sets corresponding to various items of an inventory, and a real-time result refinement subsystem. In at least one embodiment, one or more machine learning models or algorithms may be employed in each subsystem. For example, a first machine learning model (such as a deep neural network model) may be used to obtain embedding vectors representing salient characteristics of various items in one embodiment. The embedding vectors may be used as part of the input (together with feedback interpretations) to a second machine learning model in the real-time result refinement subsystem, which generates scores for individual items, indicating the suitability of the items for inclusion in the dynamically expanding result set. Additional machine learning models or algorithms may be used in other parts of the system in some embodiments—e.g., a natural language processing (NLP) algorithm may be used to interpret vocalized feedback utterances, one or more reinforcement learning algorithms may be used to tune hyper-parameters of the item scoring model, and so on.

It is noted that the term "query", as used herein when discussing various embodiments, may refer to any of several different types of interactions between a potential or actual item consumer and a network-accessible service providing access to, or enabling transactions such as purchase transactions, leasing transactions, lending transactions and so on, with respect to various items of an inventory. For example, a consumer may indicate one or more search terms or objects via a text-based or image-based search interface, or via a vocalized utterance captured by a voice-driven assistant device, and either of those two interactions may be considered a query which initiates iterative query result set refinement in various embodiments. In other embodiments, the act of navigating to a particular page of a web site (e.g., a "home page" of an e-retailer, or an "item details" page of an e-retailing web site) may be considered an implicit query regarding items associated with or displayed on those pages, and may also trigger iterative query result set refinement. Queries may thus be explicit (where a potential item consumer provides some initial level of information about a desired item or items) or implicit (where an action taken by an entity is interpreted as a possible sign of interest in some items) in various embodiments, and the contents or parameters of a query may be determined via any of a variety of programmatic interfaces.

According to one embodiment, one or more computing devices may generate, using at least a first machine learning model, a respective feature set corresponding to individual items of an item collection. A particular feature set corresponding to a particular item may be based at least in part on an image of the particular item in some embodiments. In response to a first query (which may be implicit or explicit) from an item consumer, received via a programmatic interface, an initial query result set comprising some number of items of the collection may be identified in one embodiment, and respective images of the items of the initial result set may be presented to the consumer via a presentation device (such as a phone, tablet, etc.). One or more real-time query result refinement iterations may then be performed in such embodiments.

A given refinement iteration may, for example, comprise determining that the item consumer has generated one or more feedback signals with respect to one or more items whose images have been displayed at the presentation device in some embodiments. The feedback signals, which may also be explicit or implicit as discussed below in further detail, may be considered indicative of the consumer's sentiment towards the displayed items. Explicit and/or implicit feedback signals may also be referred to as feedback indicators or sentiment indicators in various embodiments. The iteration may also include training (or re-training, depending on whether the iteration is the first of multiple iterations or not), a second machine learning model to predict, with respect to at least a subset of the items of the item collection, a respective query result candidacy metric or score in various embodiments. The training data for the model may include interpretations of the feedback signals, as well as one or more feature sets corresponding to respective items. The query result candidacy metric for an item may in effect indicate, in various embodiments, a predicted probability that the item is one that satisfies the consumer's initial query, or meets the client's expressed or unexpressed requirements for an item. For example, in one implementation a query result candidate metric or score may be expressed as a real number between 0 and 1, with a higher value indicating that the item is predicted to be more likely to satisfy the consumer's requirements than a lower value. In another implementation, the query result candidate metric may be binary classification result (a zero or a one), with a one indicating that the item is considered likely to satisfy the consumer's requirement, and a zero indicating that the item is considered unlikely to satisfy the consumer's requirement. (The terms "candidacy score" or simply "score" may be used in place of the phrase "query result candidacy metric" in parts of the subsequent description, and the machine learning model which generated the query result candidacy metric may be referred to as the score-generating model.) Based on the results of the second model, one or more additional items (e.g., some number of items with the highest scores among those for which scores were generated) to be presented to the consumer may be identified during a given iteration, and images of such additional items may be transmitted to the presentation device for display. The additional items identified during successive iterations may be considered examples of refined results of the initial implicit or explicit query, which are provided to the potential item consumer without the consumer having to explicitly specify more details about their requirements. The refinement iterations may continue in various embodiments until the interaction session is concluded, which may occur due to a variety of causes—e.g., because an item which satisfies the consumer has been identified, because the consumer has lost interest and stopped providing additional feedback, because the consumer has explicitly terminated the session, and so on.

According to at least some embodiments, additional results representing the refinement results may be added to the result set even before the consumer has completed examining the current set of query results. For example, consider a scenario in which refinement iteration K is followed by refinement iteration K+1 within a given interaction session of a consumer with an item provider service.

As part of iteration K+1, images of one or more additional items may be queued for display to the consumer, even before feedback regarding some of the additional items identified in iteration K has been received. As such, from the consumer's perspective, in such embodiments a single stream or sequence of candidate items may be presented, with more items being continuously appended to the stream or sequence as the consumer provides more feedback regarding the items that they have had a chance to view. It is noted that the feedback itself may be of varying levels of detail or explicitness in different embodiments—e.g., with respect to an image of a given item, in some embodiments the consumer may affirmatively indicate that the item is liked or disliked, or may implicitly indicate (by providing no explicit feedback) that the consumer's feelings regarding the item are not strong relative to other items. A number of different approaches towards interpreting consumer feedback signals may be employed in different embodiments. For example, in one embodiment, based at least in part on the one or more feedback signals, pairwise preference indicators with respect to one or more pairs of the items whose images have been displayed may be generated from the raw feedback signals, and the machine learning model may analyze the pairwise preference indicators to generate item scores or ranking relative to other items. Further details regarding the use of pairwise preference indicators in some embodiments are provide below.

Any of a variety of different types of machine learning models, such as a logistic regression model or a structured vector machine (SVM) model may be used to generate the result set candidacy metrics or scores for items in different embodiments. In one embodiment, a simple binary classifier may be used, while in other embodiments a neural network model may be used as the score generator model. As mentioned above, in some embodiments a deep neural network model may be used to obtain feature sets—for example, an embedding feature vector comprising 2048 numeric values, which represents a mapping of an image to a 2048-dimension space, may be obtained from a hidden layer of a convolutional neural network model. It is noted that in the latter scenario, the convolutional neural network model may have been trained for any of various purposes such as object recognition, image similarity detection and the like, and that the feature vector may be extracted from its hidden layer(s) regardless of the specific application(s) for which the output of the model may have been intended. In some embodiments, as discussed below in further detail, other types of models or algorithms may be used, e.g., in combination with a neural network-based model or independently, to obtain the feature sets for inventor items. For example, a principal component analysis (PCA) model, a canonical correlation analysis (CCA) model, and/or a supervised matrix factorization model may be employed in different embodiments for feature generation or feature processing. In at least one embodiment, a feature set generated for a given item may represent, or be generated using, one or more other attributes of the item in addition to or instead of the item's image—e.g., the feature set may be based at least in part on the item's name or title, a description provided by the item producer or seller, an item category to which the item has been assigned, and/or a price of the item. In at least one embodiment, a feature set corresponding to a particular item, initially generated using a particular combination of one or more machine learning models, may later be modified based on feedback from one or more entities such as item consumers, reviewers and the like. For example, vector representations of accumulated positive or negative feedback may be generated, and concatenated or otherwise combined with vector representations of the item images, item names and so on to obtain more sophisticated feature representations.

Any of a number of techniques may be used to identify a subset of items for which new or updated scores are to be generated in a given refinement iteration in various embodiments. In some embodiments, the subset may be identified based on a category map—e.g., the items for which iterative result set refinement is to be performed may be subdivided into a number of categories (e.g., shoes, hats, scarfs) or subcategories (e.g., running shoes, dress shoes, etc.) as part of an inventory management function, with some pairs of categories/categories being designated as more closely related than other pairs. Metadata entries stored for various items may indicate item categories and/or subcategories in some embodiments. When the initial result set for a consumer's query is identified, e.g., using a search engine which utilizes structured attributes such as item names, sizes, categories etc., one or more categories or subcategories may be identified as likely targeted categories for the consumer. In at least some refinement iterations, the items which belong to the initially-identified categories or subcategories (or closely related categories and subcategories) may be re-scored in some embodiments. However, as the consumer provides additional feedback, the categories assumed to be targeted may change—e.g., because the initial query from the consumer was not interpreted correctly, because the consumer may have modified item requirements dynamically, or for some other reason. As a result, the subset of items for which result set candidacy metrics are generated in one refinement iteration may differ from the subset of items for which the metrics are generated in another refinement iteration in at least some embodiments. The number of items scored may increase, decrease, or remain the same from one iteration to the next in some embodiments. In at least one embodiment, respective candidacy scores may be generated for all the items of an inventory in each iteration.

In at least some embodiments, weights based on explicitness, relative timing, or the modality used, may be assigned to interpretations of the feedback obtained from a consumer. For example, if a consumer emphatically indicates positive feedback for a particular item, and is less enthusiastic but still positive about another item, a higher weight may be assigned to the more emphatic positive feedback signal in the score-generating model. Similarly, as the number of feedback signals accumulated from the consumer during a particular interaction session increases, the feedback provided earlier in the session may be assigned a smaller weight than the more recent feedback signals. In some embodiments in which several different modalities or feedback pathways may be used, including voiced utterances, touch-screen gestures and the like, feedback received via one modality (e.g., voice) may be assigned higher weights than feedback received via one or more other modalities. In at least one embodiment in which a particular feedback signal comprises a voiced utterance, a feature vector (such as an embedding vector) corresponding to an utterance may be generated and provided as part of the input to the score-generating model.

In at least one embodiment, one or more hyper-parameters of the score-generating model and/or the models used for feature extraction may be tuned using a reinforcement learning model. Such hyper-parameters may include, for example, weights assigned to explicitness or relative timing of feedback signals, minimum/maximum time intervals for which feedback is collected at the client-side presentation devices before being transmitted back to the result set refinement subsystem, and so on. A reward function used in the reinforcement learning model may be based at least in part on a metric of one or more actions (such as completed purchases, entering items into shopping carts, etc.) taken by the item consumer in response to the real-time result refinement iterations.

Example System Environment

FIG. 1 illustrates an example system environment in which real-time refinement of query results based on visual feedback may be implemented, according to at least some embodiments. As shown, system 100 comprises resources and artifacts of a real-time query results refinement service 120, including a feature extraction subsystem 120 and a refinement subsystem 140. In the depicted embodiment, queries pertaining to at least a subset of items of an item catalog or inventory 110 may sometimes be hard to express precisely, e.g., because many of the important characteristics used to select individual items may be subjective, with the manner in which the items are described varying from one item consumer to another. The entity responsible for making the items of the inventory accessible (via network-based programmatic interactions) for purchase, leasing, lending or the like may store structured item attribute metadata 114 for individual ones of the items. The attribute metadata 114 for a given item may include, for example, its name or label, a description provided by the producer or vendor, size information, color information, price information and so on. For some categories of items of inventory 110, such as furniture, clothing, decorative items and the like, the item attribute metadata 114 may typically not be sufficient to respond to at least some queries regarding the items; instead, while a preliminary filtering of items based on the initial query from a potential consumer may be feasible, a final decision regarding the item to be purchased (assuming such an item is found) may involve iterations of exploring images and/or other non-text representations of the items. As discussed above, item queries may be explicit (e.g., resulting from the use of a search interface) or implicit (e.g., deduced from a navigation to a particular page of an e-retailer's web site) in various embodiments.

In the depicted embodiment, an image rendering service 118 may be employed to generate one or more images 111 of various items, to be used to respond to consumers' queries. For at least some items, the item producers may provide an adequate set of images when the items are added to the inventory 110, so a rendering service 118 may not necessarily be used for such items in various embodiments. At the feature extraction subsystem 120, feature set generators 124 implemented at one or more computing devices may consume the item images 111 and/or other item attribute metadata to produce respective feature sets for individual items of the inventory 110, and store the generated feature sets in a repository 128 accessible from the refinement subsystem 140. In various embodiments, one or more machine learning models may be used to generate the features—e.g., in one embodiment, an embedding feature vector corresponding to a given item may be obtained from a hidden layer of a deep neural network model. It is noted that non-image metadata such as an item's name, category, description and the like may be used in addition to or instead of the item's image to generate a feature vector in some embodiments.

In response to a particular query or interaction from a potential item consumer, such as a search request submitted in text form or verbally from a consumer-side presentation device 175, an initial result set comprising one or more items to be presented as candidates for the type of transaction the consumer wishes to perform (such as a purchase or lease transaction) may be identified in the depicted embodiment. In some embodiments, for example, a search engine (not shown in FIG. 1) or a web-page content selection module (also not shown in FIG. 1) in the case of navigation-deduced queries may be responsible for identifying the initial result set. Respective images of the items of the initial result set may be displayed to the potential consumer, e.g., via one or more presentation/display interfaces 178 of the device 175. The consumer-side presentation devices 175 may, for example, include smart phones, tablet computing devices, augmented/virtual reality devices, laptops, desktops, voice-driven assistant devices, wearable computing devices (such as watches) and the like in various embodiments.

After the initial result set has been presented, one or more feedback-based result set refinement iterations 162 may be performed in the depicted embodiment during a given interaction session with the potential consumer, involving a flow of information between the consumer-side presentation device and the refinement subsystem 140. Information 164 pertaining to new explicit/implicit feedback signals from the consumer may be transmitted to the refinement subsystem, and images 166 of additional items identified with the help of the newly-processed feedback may be transmitted to the consumer-side device 175, with the back-and-forth transfers concluding when the consumer makes a final selection of an item, or when the interaction session is terminated. The session may be terminated based on a variety of factors in different embodiments—e.g., because the consumer has completed the desired transaction after having selected a particular item that was presented, because the customer has given up and closed the session, because network connectivity has been lost between the consumer and the service 120 (e.g., due to a lack of a strong-enough mobile phone signal), and so on.

In various embodiments, the consumer-side presentation devices may support various modalities or mechanisms for providing feedback to the service 120 via programmatic interfaces 177 (e.g., application programming interfaces or APIs) regarding the items that have been presented. Such feedback modalities may include, for example, gesture-based feedback (e.g., via swipes on a touch-screen, or hand gestures captured via various sensors), voice or utterance-based feedback, and so on. The feedback signals generated by the potential consumer may be captured by one or more feedback detectors 172 in the depicted embodiment, and representations of the feedback signals may be transmitted to the refinement subsystem 140 as indicated by arrow 164. In one embodiment, at least some level of processing of the feedback may be performed at the consumer-side device itself—e.g., whether a particular gesture is to be interpreted as positive feedback or negative feedback may be determined at the consumer-side device 175, and/or an indication of the intensity or explicitness of the feedback may be generated at the consumer-side device 175. In other embodiments, at least some of the analysis and interpretation of the feedback signals may be performed at the refinement subsystem 140.

In the depicted embodiment, one or more result set candidacy score generators 146 may be re-trained in a given refinement iteration, with the training data set based at least in part on the feedback signals and on feature sets of the corresponding items. In some embodiments, a logistic regression model may be used as the score generator, as discussed below in further detail. After the model has been re-trained in view of the feedback, respective result set candidacy scores may be generated or updated for at least a subset of the items of inventory 110 in the depicted embodiment. The updated item scores 148 may be used to select one or more additional items 166 to be dynamically appended to the result set, and images of the additional items may be transmitted to the consumer-side presentation device 175 along with instructions which cause the images to be displayed. In some embodiments, one or more item presentation managers 152 may be responsible for various aspects of the arrangement of the additional item images—e.g., images of additional items may be queued at the item presentation managers 152 before being sent to the consumer-side devices, the images of the additional items may be ordered relative to one another based on various algorithms or heuristics and so on. In at least one embodiment, the refinement subsystem 140 may also comprise one or more to-be-scored item group selectors 144, which may select the appropriate subset of items for which scores should be updated for at least some of the refinement iterations. In some embodiments, the item group selectors 144 may for example analyze the most recent set of feedback signals to determine the members of the subset of items whose scores should be updated—e.g., the feedback signals may suggest that the set of item categories for which scores are being recalculated should be expanded, as the consumer now appears to be interested in item characteristics that had not been emphasized in the original query or in earlier feedback.

The feature extraction subsystem 120 and the refinement subsystem 140 may each be implemented using hardware and/or software elements of one or more computing devices in various embodiments. In some embodiments, at least a portion of the functionality described above may be implemented using resources of other network-accessible services, e.g., services of a provider network or public cloud environment as discussed below in further detail. In one embodiment, at least some portions of the feature extraction subsystem 120 and the refinement subsystem may be implemented jointly using a single computing device.

Imprecise Item Specification Examples

Figure 2:
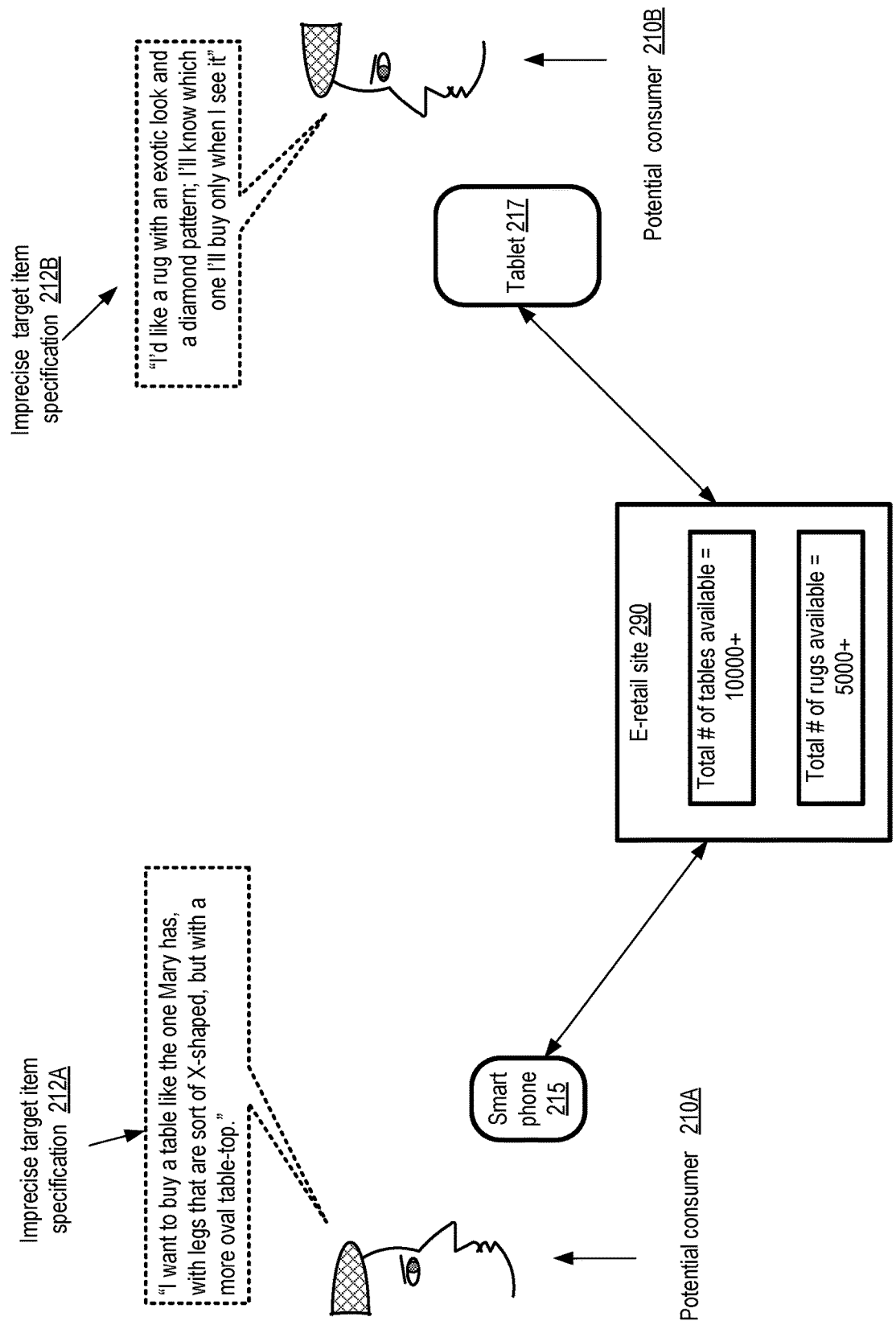
FIG. 2 illustrates examples of imprecise descriptions of items which may result in rendering some conventional types of search mechanisms at least partly ineffective, according to at least some embodiments.

FIG. 2 illustrates examples of imprecise descriptions of items which may result in rendering some conventional types of search mechanisms at least partly ineffective, according to at least some embodiments. In the depicted embodiment, potential consumer 210A may wish to use a smart phone 215 to shop for and purchase a table from an e-retail web site 290. The inventory of the e-retail web site may comprise a large number of tables—as shown, for example, more than ten thousand tables may be available for purchase. Similarly, a potential consumer 210B may wish to use a tablet computing device 217 to shop for and purchase a rug or carpet from the e-retailer, and the e-retail site 290 may have numerous rugs available (more than five thousand in the depicted example).

The potential consumers 210 may not necessarily be able to articulate or express very precise queries which can be used to identify the items that they will purchase in the depicted embodiment (assuming that suitable items that would satisfy the consumers are actually present in the inventory of the e-retailer). To select a table, consumer 210A may for example, wish to express something like imprecise target item specification 212A: "I want to buy a table like the one Mary has, with legs that are sort of X-shaped, but with a more oval table-top". Such a specification may be hard to convert into the sort of search terms which at least some search engines work with, making traditional search engines hard to use. Of course, consumer 210A may enter a generic search term such as "table" (and/or the somewhat more specific phrase "oval table-top") into a search interface provided by the e-retailer, and the kinds of iterative result set refinement iterations discussed above may be initiated by such a generic search. To specify the desired rug, another imprecise target item specification 212B may be formulated by consumer 210B: "I'd like a rug with an exotic look and a diamond pattern; I'll know which one I'll buy only when I see it". Again, although the terms "rug" and "diamond pattern" may be used as search terms, narrowing down the collection of available rugs to a particular rug that consumer 210B might purchase may take multiple iterations of result set refinement. The process of selecting items that meet the needs of consumers such as 210A or 210B may be considerably simplified in various embodiments by using the real-time visual feedback-based machine learning techniques described herein.

Methods for Real-Time Refinement of Result Sets Based on Analysis of Visual Feedback FIG. 3 is a flow diagram illustrating aspects of operations that may be performed to refine item query results in real time, according to at least some embodiments. As shown in element 301, a collection of items for which real-time query result set refinement is to be employed may be identified—e.g., items belonging to categories such as clothing, furniture etc., for which precise search terms are sometimes hard for consumers to articulate, and for which image-based selection is common may be identified.

Using at least a first machine learning model, a respective feature set (e.g., an embedding vector in a high-dimensional space, obtainable from a hidden layer of a deep neural network model used for image recognition applications) corresponding to each of the items may be generated in the depicted embodiment (element 304). The feature vector for a given item may encode or represent salient learned properties of the item, and may be derived from one or more images of the item and/or other attributes such as a name/title, a description, and so on in various embodiments. In at least one embodiment, feature sets that may have been generated for some other purpose (or by some third party) for at least some items may be obtained and re-used—that is, it may not be necessary to generate feature sets for all the items of interest. In one embodiment, with regard to a subset or all of the items, a pre-existing collection of features may be refined for use in the real-time result refinement iterations. For example, in some scenarios, as discussed below in further detail in the context of FIG. 7, features may be generated in two stages—a global and a per-item-category stage. Global features that were extracted earlier and used initially for a different application may be provided as input to the per-item-category stage of feature generation in some embodiments.

An initial result set of items to be presented to a potential consumer may be identified, e.g., in response to a search query or some other programmatic interaction with the consumer (element 307). If, for example, a text search term is provided by the consumer, a search engine may be used to identify members of the initial result set. Even if the search text contains various subjective or imprecise terms, a search engine may be able to extract some concrete terms and use those concrete terms to identify an initial set of potential candidate items which may meet the requirements of the consumer in some embodiments. As mentioned earlier, the programmatic interactions may involve the use of any of a variety of interfaces and/or mechanisms in different embodiments. A consumer may indicate one or more search terms or objects via a text-based or image-based search interface, or via a vocalized utterance captured by a voice-driven assistant device, and either of those two interactions may be considered a query which initiates iterative query result set refinement in various embodiments. In other embodiments, the act of navigating to a particular page of a web site (e.g., a "home page" of an e-retailer, or an "item details" page of an e-retailing web site) may be considered an implicit query regarding items associated with or displayed on those pages. In one embodiment, if a potential consumer takes a photograph/video or indicates that the consumer likes a particular photograph/video, this may be interpreted as an indication of interest in similar items to those visible in the photograph or video, and may trigger iterative query result set refinement (e.g., if the potential consumer has "opted-in" to such interpretations of photograph-related or video-related interactions).

Images of the items of the initial result set may be transmitted for display at a presentation device (e.g., a phone, tablet, AR/VR device, laptop, etc.) of the consumer which supports real-time interactive feedback (e.g., by swiping, check-marks, gestures, utterance capture, etc.) in the depicted embodiment (element 310). In some embodiments, a plurality of consumer-side devices may be used to collectively display the result set and enable feedback signals to be provided—for example, item images may be displayed on a laptop device, while feedback signals may be detected using a voice-driven personal assistant device.

The initial set of items may or may not include an item that meets the consumer's needs. If the consumer is able to finalize the choice of an item, as detected in operations corresponding to element 313, additional result set refinement may not be required. Otherwise, unless one or more other criteria for terminating result set refinement iterations have been met (as also detected in operations corresponding to element 313), the next result set refinement iteration may be begun in the depicted embodiment. The termination criteria may, for example, include determining that no new feedback has been provided by the consumer in some time interval, or determining that network connectivity with the consumer's device is no longer available, and so on.

In a given result set refinement iteration, a set of one or more explicit and/or implicit feedback signals or indicators may be collected and interpreted (element 316). Depending on the size of the result set which has already been identified, the feedback signals may be collected and/or interpreted even before the items already identified as candidate members of the result set have all been viewed. For example, ten items may have been selected for display, of which only four may have been displayed at the time that feedback detected for those first four items is analyzed. As discussed below, in some embodiments, an absence of a positive signal (e.g., a "like" gesture) for some time interval may be interpreted as an implicit negative signal or an indicator of negative sentiment (e.g., similar to a "don't like" gesture, or at least "don't like very much"). The strength of the signal or indicator may also be detected and/or interpreted in some embodiments—e.g., an implicit signal may be considered a weak rather than a strong indicator of sentiment. For some types of applications, the absence of a negative signal for some time may be interpreted as an implicit indicator of a positive sentiment.

Based at least partly on the collected feedback, a second machine learning model may be trained or re-trained to generate result set candidacy scores of various items (e.g., predicted probabilities that the item is the one that the customer will choose) in the depicted embodiment (element 319). The training data may include, for example, the interpreted feedback signals and the feature sets of some subset or all of the items in various embodiments.

Using output scores generate by the second model, one or more additional items may be identified for presentation to the consumer (element 322) in the depicted embodiment. Images of the additional items may be transmitted to the consumer's presentation device, and appended to the images being presented to the customer in real time (e.g., making it appear as though the additional items were identified in response to the original interaction with the customer). In some embodiments, images of the additional items may not necessarily be appended to the existing result set; instead, one or more images that were in the existing result set (but may not yet have been shown) may be replaced by the newly-identified images, and/or the combined set of images identified thus far may be rearranged or reordered. In at least one embodiment, when an image of an additional item is transmitted to the presentation device, it may be rendered programmatically by a browser or similar program of the presentation device, but may not necessarily be visible to the consumer until the consumer scrolls down within the result set, e.g., due to screen size constraints. In some embodiments, rendered versions of the images of newly-identified items may be cached for eventual display at the presentation device. If the presentation of the additional items (or any of the previously presented items) enables the consumer to finalize the selection of a particular item (as detected in element 313), the refinement iterations may be concluded (element 399). Otherwise, assuming other criteria for concluding the iterations have not been met, operations corresponding to elements 316-322 may be repeated as part of the next real-time result set refinement iteration in the depicted embodiment.

In some embodiments, informational content formats other than images may be used for presenting candidate items of a result set to consumers—for example, short video segments and/or audio segments may be used. In such embodiments, feature vectors may be generated for video or audio characterizations of the items of the collection, and used together with feedback signals to re-score items iteratively. In some cases, the items may comprise audio or video: e.g., result sets for queries pertaining to songs, television shows or segments and the like may be refined using techniques similar to those discussed in the context of FIG. 3.

It is noted that in various embodiments, some of the operations shown in FIG. 3 may be implemented in a different order than that shown in the figure, or may be performed in parallel rather than sequentially. Additionally, some of the operations shown in FIG. 3 may not be required in one or more implementations.

Refinement Result Display Example

Figure 4:
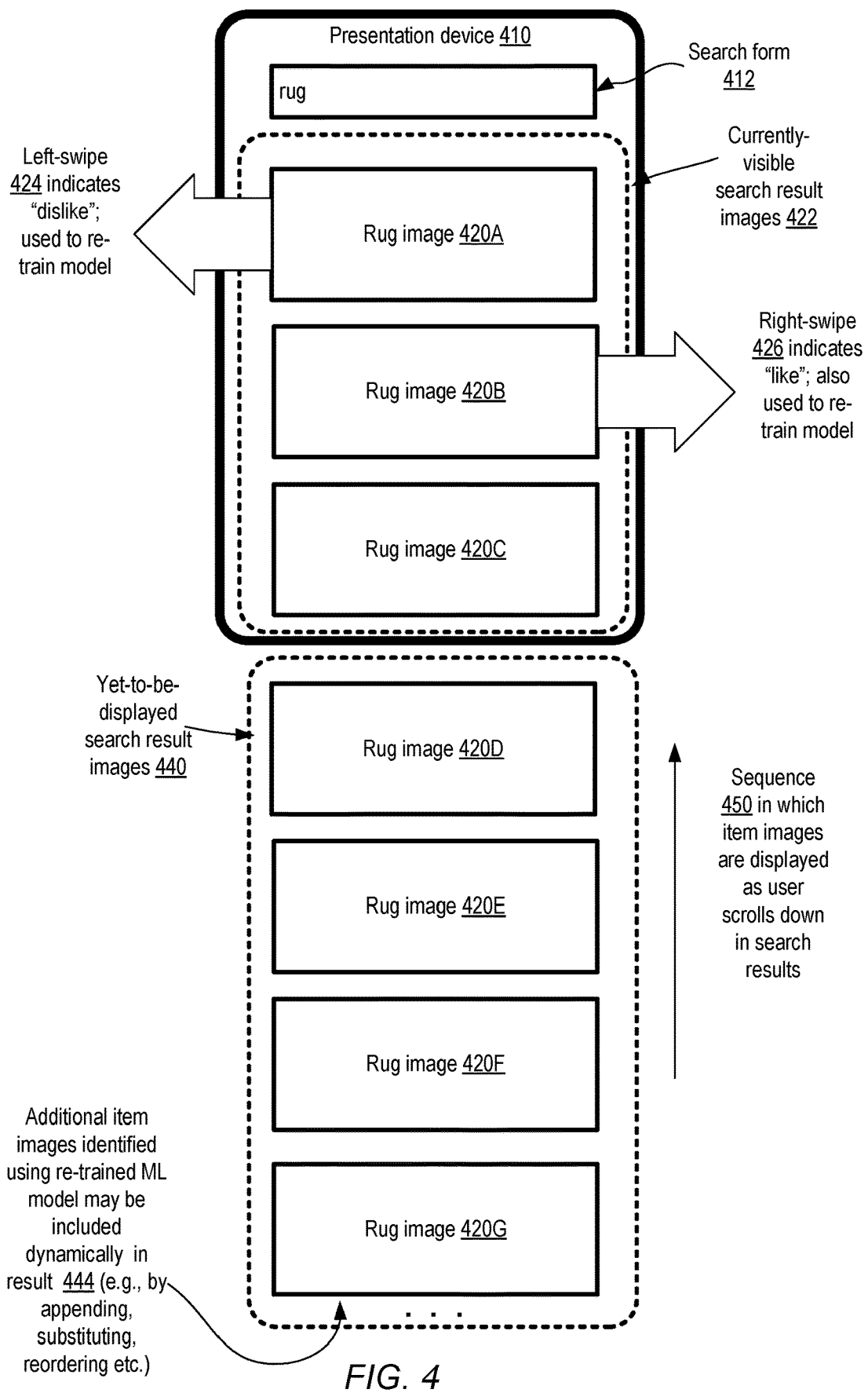
FIG. 4 illustrates an example presentation device at which images of items identified using a dynamically re-trained feedback-driven machine learning model may be appended to a sequence of search results in real time, according to at least some embodiments.

FIG. 4 illustrates an example presentation device at which images of items identified using a dynamically re-trained feedback-driven machine learning model may be appended to a sequence of search results in real time, according to at least some embodiments. In the depicted embodiment, the presentation device 410 (which may comprise, for example, a smart phone), may include a display of a search form 412 into which text search terms may be inserted by a potential item consumer, as well as a region 422 for currently-visible search results, which can accommodate up to three images.

The presentation device 410 may detect swiping gestures made by users on a touch screen, such as a left-swipe gesture 424 or a right-swipe gesture 426 in the depicted embodiment.

At a point of time corresponding to the scenario depicted in FIG. 4, a consumer has submitted a search query with the term "rug" via the search form. An initial query result set comprising at least seven rugs has been identified; images of three of the rugs, 420A, 420B and 420C have been displayed on the device 410. Rug images 420D, 420E, 420F, and 420G have already been identified as candidates that may meet the consumer's requirements, but have not yet been displayed; they are currently queued for display in the sequence 450. If the consumer provided input via a scroll-down interface element, the item images 420D onwards would be displayed in region 422, and one or more of the images 420A-420D may no longer be displayed until a scroll-up interface element is used.

The consumer has provided, by a left swipe 424, feedback indicating a dislike of rug image 420A, while right swipe 426 has been used to provide feedback indicating that the consumer likes rug image 420B. These feedback signals may have been captured, interpreted, and used to re-train a machine learning model. Updated scores for various items may be generated, and based on those scores, one or more additional items may be included among the yet-to-be-displayed search result images 440 (as indicated in label 444) in the depicted embodiment, e.g., even before the consumer has viewed all the previously-queued images. To the consumer using the presentation device, the fact that a machine learning model has been re-trained and re-executed may not be apparent in the depicted embodiment; instead, to the consumer, the look-and-feel of a single stream or sequence of search results (with the quality of the results improving as more results are seen) may be presented.

In at least some embodiments, additional images identified using the re-trained machine learning model may not necessarily be positioned at the tail end of the yet-to-be-displayed result set. Instead, depending for example on the relative strength or emphasis of the feedback that has been analyzed most recently, one or more of the additional images may be added at the head of the to-be-displayed collection of images, or somewhere in the middle of the collection. In one embodiment, one or more of the images identified earlier may be replaced or substituted by one or more of the newly-identified images.

Machine Learning Model Types

Figure 5:
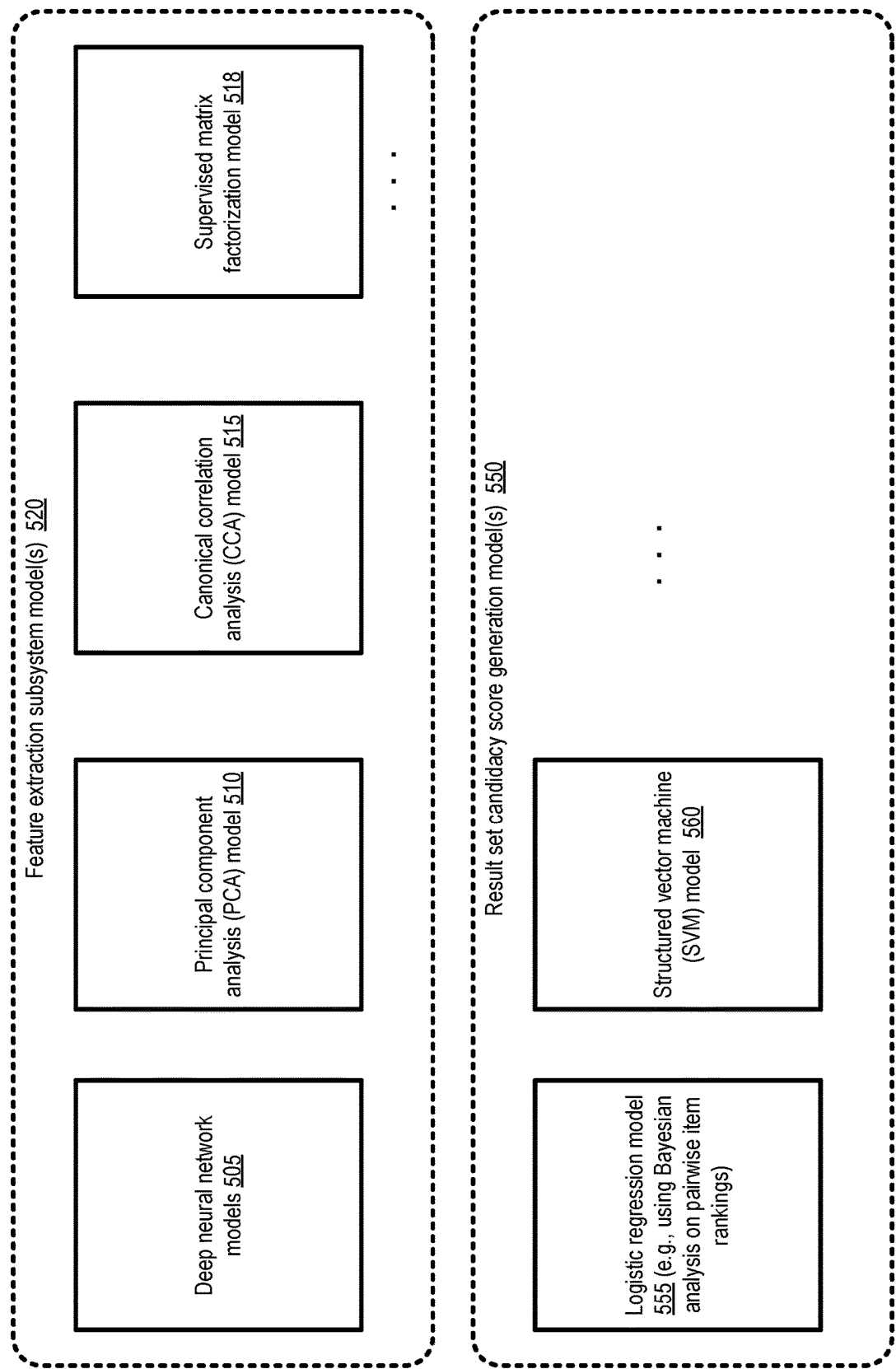
FIG. 5 illustrates examples of machine learning models that may be employed to extract feature sets for items of an inventory, and to generate result set candidacy scores for the items, according to at least some embodiments.

FIG. 5 illustrates examples of machine learning models that may be employed to extract feature sets for items of an inventory, and to generate result set candidacy scores for the items, according to at least some embodiments. As shown, feature extraction subsystem models 520 may include, among others, deep neural network (DNN) models 505, principal component analysis (PCA) models 510, canonical correlation analysis (CCA) models 515, and/or supervised matrix factorization models 518 in various embodiments. In some embodiments, more than one type of machine learning model may be employed for feature processing—e.g., as discussed below, for a given item, a high-dimensional feature vector may be generated using a DNN model, and then the dimensionality of the vector may be lowered using another model. In some embodiments, feature sets generated using multiple models may be combined. For example, in one embodiment one model may be used to generate a first feature vector based on an item's image. A second model may be used to generate a second feature vector based on some set of structured attributes provided by an item's owner such as the item's title and/or description, while a third model may be used to generate a third feature vector based on less structured information such as item reviews. The feature vectors obtained from the three models may be aggregated (e.g., via concatenation, or using a fourth machine learning model) and used for generating the result set candidacy scores.

The result set candidacy score generator models 550 may comprise, for example, a logistic regression model 555 and/or a structured vector machine (SVM) model 560 in some embodiments. Any of a number of different approaches may be taken with respect to logistic regression in different embodiments. As described below in further detail, in at least one embodiment, a Bayesian analysis may be performed, with pairwise item preferences derived from the feedback signals provided by an item consumer. In other embodiments, a frequentist rather than a Bayesian analysis may be used.

Feature Vector Extraction

Figure 6:
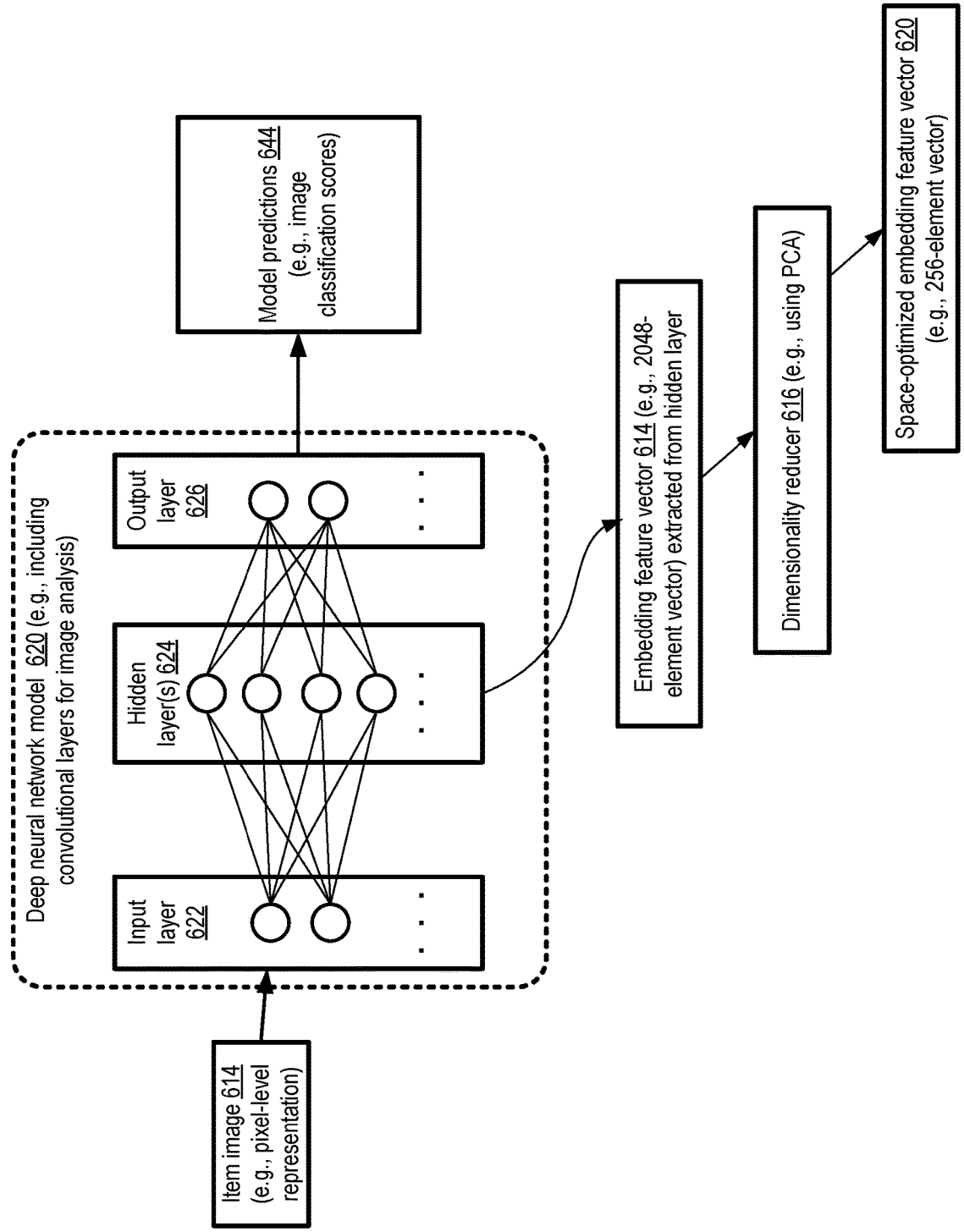
FIG. 6 illustrates a high-level overview of a technique for obtaining embedding feature vectors for items from a deep neural network, according to at least some embodiments.

FIG. 6 illustrates a high-level overview of a technique for obtaining embedding feature vectors for items from a deep neural network, according to at least some embodiments. In the depicted embodiment, item image data 614 (e.g., a matrix of h x w x p numerical values, where h is the height of the image in pixels, w is the width of the image in pixels, and p bits are used to encode each pixel) may be provided as input to a deep neural network (DNN) model 620. The DNN model may, for example, comprise, in addition to an input layer 622 and an output layer 626, one or more hidden layers 624. The hidden layers may, for example include, convolutional layers, pooling layers, and/or fully-connected layers in some embodiments. The DNN model 620 may be trained to generate model predictions 644 for any of several different computer vision-related applications, such as image recognition/classification applications, image similarity detection applications, and so on.

For the purposes of result set refinement, an embedding feature vector 614 (e.g., a 2048-element numerical vector or a 4096-element numerical vector) may be extracted in the depicted embodiment from one or more of the hidden layers 624. As such, the DNN model 620 may not necessarily be used for its original intended application, such as image recognition or classification, but may instead be used for the way that salient characteristics of the input images are learned and represented internally within the model in at least some embodiments.

In at least one embodiment, a dimensionality reducer 616 (e.g., another machine learning model or layer) may be used to reduce the dimensionality of the originally-extracted feature vector 614, e.g., from a 2048-dimension vector to a 256-dimension vector. In some embodiments, for example, a PCA or CCA model may be used for dimensionality reduction. Dimensionality reduction may help to speed up the re-scoring of items in various embodiments. A tradeoff may have to be considered in at least some embodiments between the performance benefits of smaller feature vectors, and the ability to represent important characteristics of the items—e.g., lower-dimensionality vectors may lead to faster scoring, but an excessive reduction in the dimensionality may potentially result in the loss of important characterizations of the images. As mentioned earlier, in at least some embodiments feature vectors may be derived not just from images, but also from other attributes such as titles, categories, descriptions, price and the like.

Figure 7:
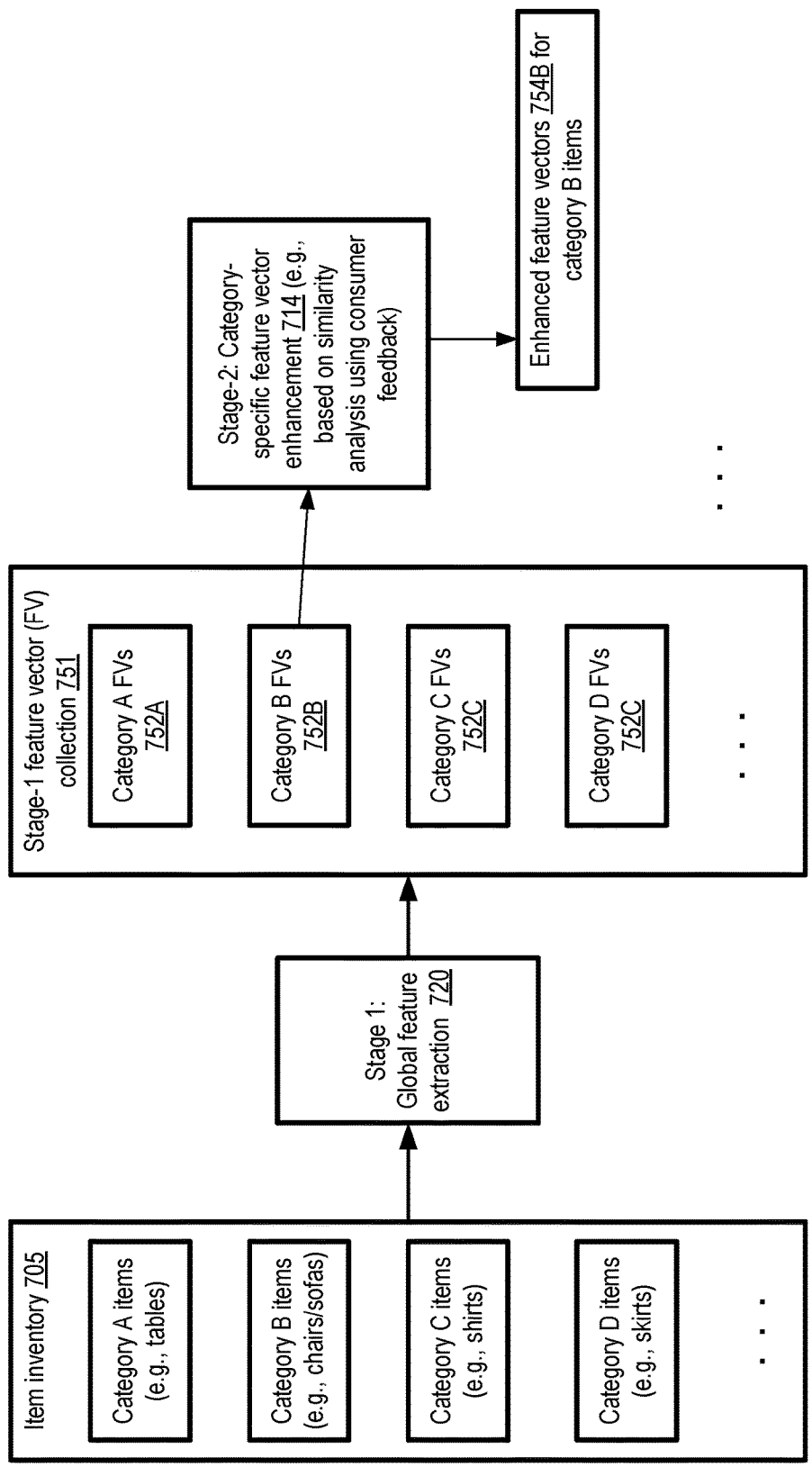
FIG. 7 illustrates an example multi-stage technique for obtaining embedding feature vectors for items, according to at least some embodiments.

FIG. 7 illustrates an example multi-stage technique for obtaining embedding feature vectors for items, according to at least some embodiments. In the depicted embodiment, an item inventory or catalog 705 may comprise items designated as examples of various categories—for example, category A may comprise tables, category B may comprise chairs/sofas, category C may comprise shirts, category D may comprise skirts, and so on. Respective metadata entries associated with individual items of the item collection may comprise an indication of the item's category in at least some embodiments. In response to an implicit or explicit query, one or more item categories may be identified as target item categories for a potential item consumer in at least some embodiments, and the stored metadata may be used to select the subset of items from which the initial result set and subsequent additions to the result set.

In addition to being used to identify the items to be re-scored in various refinement iterations, category information may also be used to generate enhanced feature sets in the embodiment depicted in FIG. 7. In a first global stage of feature extraction 720, images for items belonging to all the categories of interest may be analyzed using a particular set of one or more machine learning models in the depicted embodiment, and respective feature vectors of collection 751 may be extracted, e.g., using a technique similar to that illustrated in FIG. 6. Groups of Stage-1 feature vectors 752A-752D may be generated for items of categories A-D, for example, and stored in a repository.

In Stage 2, a category-specific feature enhancement technique 714 may be employed in the depicted embodiment. For example, feedback on similarity among items of a particular category such as category B may be obtained from consumers, and used to transform the feature vectors further, capturing subtle differences among the items within that particular category. Enhanced feature vectors such as 754B may thereby be generated for items of a selected category, which encode more detailed information than might have been represented in the global feature vectors. The enhanced feature vectors 754B may then be used to refine result sets which include items of category B in the depicted embodiment. It is noted that in some embodiments, multi-stage feature processing similar to that illustrated in FIG. 7 may not necessarily be performed for one or more item categories. The consumer feedback that is used for the enhancement stage (Stage 2) may be implicit rather than explicit in at least some embodiments. For example, the system may not require a consumer to explicitly state that chair C1 is similar to chair C2—instead, the respective feedback signals generated by numerous consumers regarding multiple items of a given category such as chairs may be interpreted using machine learning to determine apparent similarity scores of pairs of items, and the similarity scores may then be used to enhance the feature vectors. In one embodiment, instead of relying on consumer feedback, other groups of individuals or entities may be used for the category-specific feature enhancement stage—e.g., individuals who are interested in signing up for paid short-term work assignments via a network-accessible service may be asked to select similar pairs of chairs based on the chairs' images, and the feedback obtained from such individuals may be used to enhance the feature vectors.

Logistic Regression Model Using Pairwise Preferences Deduced from Feedback Signals In some embodiments, as mentioned earlier, a logistic regression model whose input comprises pairwise preferences among items may be re-trained iteratively to predict result set candidacy metrics. Some of the mathematical details of such an approach, including example notation and formulas which may be used in a Bayesian analysis, are provided here.

Assume that the item collection comprises N items labeled 1 through N. The feature vectors corresponding to the items (e.g., embedding vectors similar to those discussed above, obtained from a hidden layer of a deep neural network model) may be represented as $\{x_1 \ldots x_N\}$. In some embodiments, a transformation function $f$ may be applied to the initial feature vectors, e.g., using PCA or some other approach, resulting in transformed feature vectors $\{f(x_1) \ldots f(x_N)\}$; however, to simplify the presentation, $f$ may be ignored in the remainder of this discussion (or equivalently, assumed to be the identity function).

Pairwise preferences regarding at least some pairs of the items may be derived or deduced from the feedback signals generated by consumers as they respond to items of the currently predicted result set in various embodiments. The preferences may be derived from the raw feedback signals using any of a variety of interpretation algorithms in different embodiments, such as algorithms which model the relative semantic strengths of the feedback signals, the proximity in space and time between respective feedback signals for items, and so on.

The notation $S_{ij}$ may be used to represent a deduction that the consumer preferred item i to item j. As discussed earlier, feedback and preference information may be implicit or explicit. Consider an example scenario in which the consumer device's interface enables "like" and "dislike" signals to be provided for a given item, and items are presented in a sequence through which the consumer may scroll down (forward in the sequence) or up (backward in the sequence). $S_{ij}$ may be deduced if any of the following were detected: the consumer (a) "liked" i but didn't like an adjacent item j; (b) "liked" item i and "disliked" an adjacent item j (this may represent an example of an explicitly-expressed preference); (c) "liked" i after scrolling past j; or (d) "liked" i and scrolled down, then disliked a non-adjacent j (in this latter case, it may not be clear whether j was disliked relative to i or relative to some intervening items in the result set). Both implicit and explicit feedback signals may be detected and analyzed in various embodiments (where the implicit signals may correspond to the absence of an explicit signal such as a "like"/"dislike" gesture during some time interval); in other embodiments, only explicit signals may be considered. In at least some embodiments, a weight $y_{ij} \in [0,1]$ may be assigned to a preference datum based on its explicitness and/or its recentness (the timing of the expressed feedback relative to the time that the deduced preference information is generated and/or used in the model).

An assumption may be made that the consumer has provided a list of one or more preferences $S_{ij}$ which depend on some unknown "ideal" (with respect to the consumer's needs) target item t. Expressed in terms of features of the multidimensional feature space, if the customer prefers i to j, this implies that there is an unknown target item with features $x_t$ such that $\|x_i - x_t\|^2 < \|x_j - x_t\|^2$. In words, this inequality indicates that the (unknown) target item t is closer in the vector space to item i than it is to item j.

Equation 1 represents a likelihood for observing $S_{ij}$ for a given target item t.

$$\mathbb{P}(S_{ij} \mid t) = \frac{1}{1 + e^{-\alpha(\|x_j - x_t\|^2 - \|x_i - x_t\|^2)}} \qquad \text{Equation 1}$$

Here, $\alpha$ is the error rate. To interpret Equation 1, it may be helpful to consider the following edge cases. If i and j are equidistant from t, then the term in the brackets in the denominator of Equation 1 is zero, and so the probability of preferring i over j is simply 0.5, regardless of α. If t is i, and j is very different from t (e.g., infinitely distant from t in the vector space, such that $\|x_j-x_t\|=\infty$), then the probability of preferring i over j becomes 1. Furthermore, consider the possibilities for values of the error rate α. If $\alpha^{-1}=\infty$, $\mathbb{P}(S_{ij}|t)=0.5$; that is, when $\alpha^{-1}$ is very large, the consumer's response is interpreted as being random, and the alignment of the response with the vector space is a coin flip. In contrast, if $\alpha^{-1}=0$, $\mathbb{P}(S_{ij}|t)=1$; that is, there is no noise and the vector space always aligns with the consumer preferences. The above likelihood can be expressed a logical regression optimization over the difference vectors.

If the "ideal" or target item t were known, it would be trivial to select the item of the inventory to satisfy the consumer's need. The item k* whose feature vector was closest to the target would be selected: $k^*=\mathrm{argmin}_{k\in 1\ldots N}\|x_k-x_t\|^2$. However, the target item t may usually be unknown in various embodiments, and so may have to be learned from consumer feedback, modeled via the preference pairs. It may be assumed in various embodiments that the $S_{ij}$ preferences are independent of one another; that is, if the collection of preferences obtained from the consumer is represented as D, Equation 2 may be assumed to hold:

$$\mathbb{P}(D|t)=\Pi_{S_{ij}\in D}\mathbb{P}(S_{ij}|t) \quad\quad \text{Equation 2:}$$

In at least some embodiments, a technique called Thompson sampling may be used to balance the tradeoff between exploitation and exploration of the vector space representing the items. Thompson sampling involves sampling a target t from the posterior distribution of the noise model and then recommending a particular item $\hat{k}$ based on the sample, where $\hat{k}=\mathrm{argmin}_{k\in 1\ldots N}\|x_k-x_t\|^2$. The posterior distribution is given by:

$$\mathbb{P}(t|D) \propto \mathbb{P}(D|t)\mathbb{P}(t) \quad\quad \text{Equation 3:}$$

In Equation 3, $\mathbb{P}(t)$ is the prior distribution on the target. In at least some embodiments, a Gaussian prior may be assumed, e.g., $\mathbb{P}(t)=t\sim N(t_0, \sigma^2 I)$, where $t_0$ may correspond to a randomly-selected item or one of the items of the initial result set, and $\sigma^2$ controls the strictness of the prior. In some embodiments, a prior may also be applied to the error rate α; in other embodiments, the error rate may be assumed to be fixed.

In various embodiments, posterior densities over the items may be computed, and the densities may then be sampled to identify items to be added to the result sets. Equations 4 follows from Equations 2 and 3, and Equation 5 is obtained by taking logarithms of both sides of Equation 4.

$$\mathbb{P}(t|D) \propto \Pi_{S_{ij}\in S}\mathbb{P}(S_{ij}|t)\mathbb{P}(t) \quad\quad \text{Equation 4:}$$

$$\log \mathbb{P}(t|D) \propto \Pi_{S_{ij}\in D}\log \mathbb{P}(S_{ij}|t)+\log \mathbb{P}(t) \quad\quad \text{Equation 5:}$$

Both terms on the right side of Equation 5 may be calculated from the known corresponding probability density functions in various embodiments.

In some embodiments, factors such as explicitness/recentness of pairwise comparisons may be modeled using scalar weights assigned to the $\mathbb{P}(S_{ij}|t)$ terms. For example, a single scalar weight $y_{ij}$ for the combination of explicitness and recentness may be added to transform Equation 5 to Equation 6, or separate scalar weights $e_{ij}$ (for explicitness) and $w_{ij}$ (representing a time-decay associated with the interval that has elapsed since the feedback was provided) may be used to transform Equation 5 to Equation 7.

$$\log \mathbb{P}(t|D) \propto \Pi_{S_{ij}\in D}\log(y_{ij}\mathbb{P}(S_{ij}|t)+\log \mathbb{P}(t) \quad\quad \text{Equation 6:}$$

$$\log \mathbb{P}(t|D) \propto \Pi_{S_{ij}\in D}\log(e_{ij}w_{ij}\mathbb{P}(S_{ij}|t)+\log \mathbb{P}(t) \quad\quad \text{Equation 7:}$$

Using equations 5, 6 or 7, $\log \mathbb{P}(t|D)$ may be computed for various items in some embodiments (e.g., during each real-time refinement iteration), giving discrete density values for the item collection. Note that if the posterior is multimodal, this would be captured in the posterior densities; the entire posterior distribution would not have to be computed in at least some embodiments.

In one embodiment, the log posterior densities may be sorted and one or more corresponding items may be added to the result set based at least in part on the sort order. A small amount of noise may be added to the posterior to jitter it slightly in some embodiments to avoid presenting duplicate or near-duplicate items adjacent to one another in a refined result set.

According to some embodiments, the discrete density values may be converted to a discrete probability mass function (pmf), and then sampled to select the items to be added to the result set. Annealing may be used to sharpen the posterior in some embodiments before normalizing to a pmf. To obtain the posterior pmf $p_i$ of the $i^{th}$ item, Equation 8 may be used:

$$p_i=e^{(P(x_i|D)-z)}/\Sigma_{j\in 1\ldots N}e^{(P(x_j|D)-z)} \quad\quad \text{Equation 8:}$$

In Equation 8, $z=\max_{i\in 1\ldots N}P(x_i|D)$. It is noted that in some embodiments, to avoid numerical stability issues, the dataset may be scaled down by a constant factor, with the factor being selected based for example on the number of dimensions of the feature representation used. Techniques other than pairwise preference based logistic regression may be used to generate item scores in at least some embodiments.

Example Showing Rapid Adaptation of Search Results to Feedback

Figure 8:
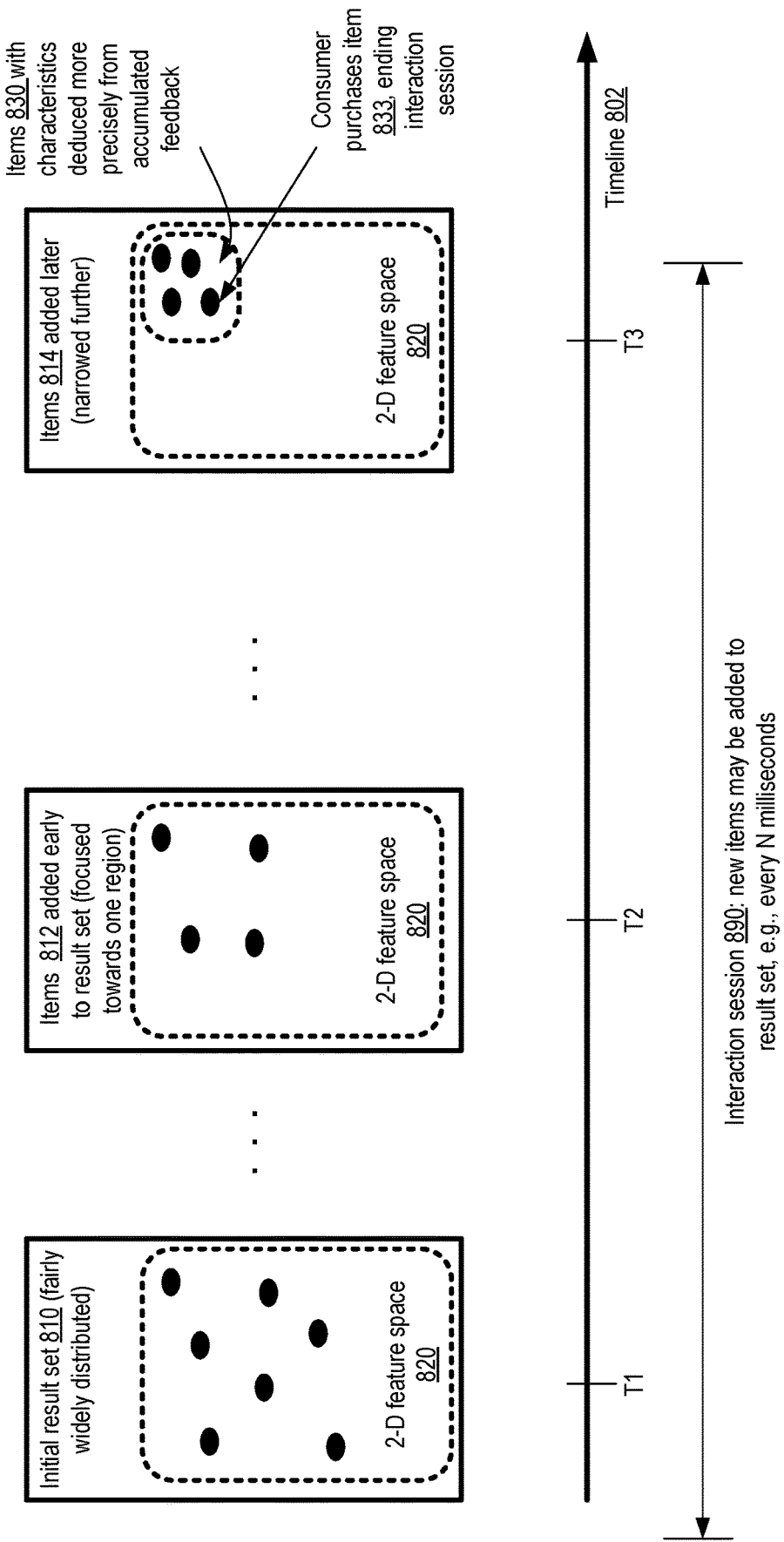
FIG. 8 illustrates a timeline indicating the real-time narrowing of search results within a multi-dimensional space based on accumulated feedback, according to at least some embodiments.

Using a machine learning model that can be re-trained quickly with just a few examples derived from consumer feedback (such as a logistic regression model of the kind discussed above), and then re-executed rapidly to generate new scores for at least some subset of the item inventory, result set refinement or adaptation may be accomplished within very short periods of time in various embodiments. FIG. 8 illustrates a timeline indicating the real-time narrowing of search results within a multi-dimensional space based on accumulated feedback, according to at least some embodiments.

In the depicted embodiment, three interactions between a potential consumer of an item and a system for refining consumers' result sets are shown along timeline 802, with time elapsing from left towards the right. At some time T1, shortly after the interaction session 890 may have been initiated by an item consumer as a result of a submission of a search query in the depicted embodiment, respective images of a plurality of items of an initial result set 810 may be displayed on a presentation device of the consumer. To simplify the presentation, the statistical distribution of the items (represented via small darkened ellipse symbols) is shown within a two-dimensional feature space 820; in practice, the number of dimensions of the feature vectors may be much higher. As shown, the items in the initial result set may be fairly widely distributed within the feature space (e.g., the feature space of a given category indicated in the search query, such as "rugs" or "tables").

Based on the feedback received with respect to the initial result set, the region of the feature space from which items are selected for presentation may gradually be narrowed. At some time T2, for example, items 812 from a region closer to the upper right half of the feature space 820 may be presented, as the system learns more about the preferences of the consumer. Later, at time T3, after one or more additional iterations of feedback and refinement, the items 830 selected may lie within a much smaller region in the depicted example scenario, with characteristics deduced more precisely from the accumulated feedback. The consumer may decide to purchase a particular item 833 shortly after T3, ending the interaction session. In at least some embodiments, the entire interaction session may last no more than a few seconds, with new items being added every N milliseconds. As such, from the consumer's perspective, the process of identifying an item that meets requirements may be relatively short, smooth and seamless in various embodiments, without requiring multiple iterations of detailed text input.

Example Secondary Feedback Properties Used for Score Generation

Figure 9:
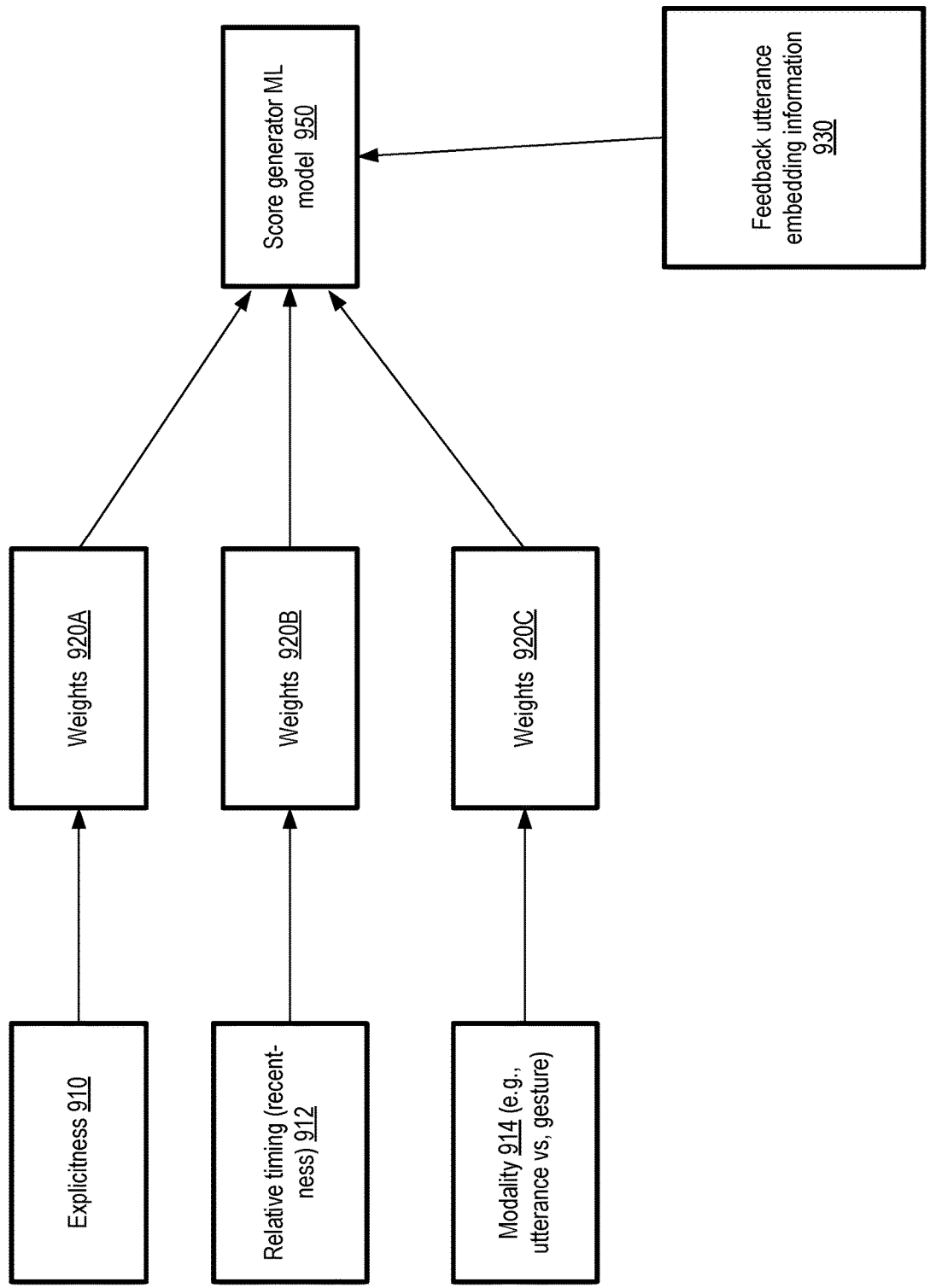
FIG. 9 illustrates examples of feedback properties for which weights may be assigned in a machine learning model used to generate result set candidacy scores, according to at least some embodiments.

As indicated earlier, in at least some embodiments, the manner in which a feedback signal (or groups of feedback signals) is used in the score generator model may be influenced by factors such as interpretations of the explicitness or forcefulness of the signals. FIG. 9 illustrates examples of feedback properties for which weights may be assigned in a machine learning model used to generate result set candidacy scores, according to at least some embodiments.

Weights 920A (similar to the weights $y_i$ and $e_{ij}$ discussed in the context of Equation 6 and Equation 7 earlier) may be assigned to individual feedback signals based on the explicitness of the signals in some embodiments. In at least one embodiment, the relative timing or recentness 912 of various feedback signals may also or instead be modeled using weights 920B (similar to the weights $y_{ij}$ and $w_{ij}$ discussed in the context of Equation 6 and Equation 7 earlier). Respective numerical metrics of the explicitness may be computed from the feedback signals using any of a variety of algorithms in different embodiments—e.g., a measure of the force with which a swipe was performed, or the time it took to complete the swiping gesture, may be used as indicators of explicitness. In some embodiments, a lack of feedback for some item (when compared to actual feedback for some nearby item in the presented result set) may be interpreted as an implicit feedback signal, and may be assigned a low explicitness-related weight.

In the depicted embodiment, it may be possible for item consumers to submit feedback regarding result set items via several different modalities or communication mechanisms—e.g., verbal utterances such as "I really like that table" or "How pretty!" may be used in addition to gestures such as swipes to express opinions regarding various items. If the consumer expresses an opinion verbally, this may (for example) be taken to be a stronger indication of the consumer's preferences than a swipe gesture. Accordingly, respective weights 920C may be assigned to feedback signals based on the modality 914 employed in some embodiments.

The weights 920A-920C may be used within the score generator model 950, e.g., one or more computations based at least in part on the weights may be performed during the re-training iterations in various embodiments. At least some of the weights 920 may be considered tunable hyper-parameters of the result set refinement service, e.g., the magnitudes of the weights may be adjusted over time as more is learned about the behavior and preferences of more and more item consumers. In some embodiments, respective values of the weights to be used for specific consumers based on the kinds of factors shown in FIG. 9 may be stored at the result set refinement service.

In at least one embodiment in which verbal utterances are potentially used to provide feedback regarding presented items, the process of scoring items may be enhanced using an utterance interpretation based technique. The utterances may be mapped to respective embedding vectors using a natural language understanding (NLU) or natural language processing (NLP) machine learning model, in effect capturing at least some characteristics of the verbal feedback. Such embedding information 930 may also be provided as input to the score generator machine learning model 950, and may be used to shift the target region of the item features embedding space from within which additional items are selected for inclusion in result sets in some embodiments. In effect, a composite feature vector which includes embedding values associated with the utterances (if any) as well embedding values obtained from images and/or other attributes may be used in such embodiments.

In at least some embodiments, various hyper-parameters of the models used for generating result set candidacy scores and/or feature vectors may be tuned using one or more reinforcement learning models or algorithms. For example, in one embodiment, metrics based on actions taken (or not taken) by potential item consumers in response to the refinement of their query result sets may be computed. Such metrics may, for example, represent how often or how quickly a consumer completed a purchase transaction after being presented with refined result sets, how often a consumer placed an item into a "wish-list" or a shopping cart of an e-retailer's web site, how long different consumers remained actively interacting with an e-retailer's web site, and so on. A reward function used in the reinforcement learning model may be based at least in part on such consumer action metrics in some embodiments.

Provider Network Environment

Figure 10:
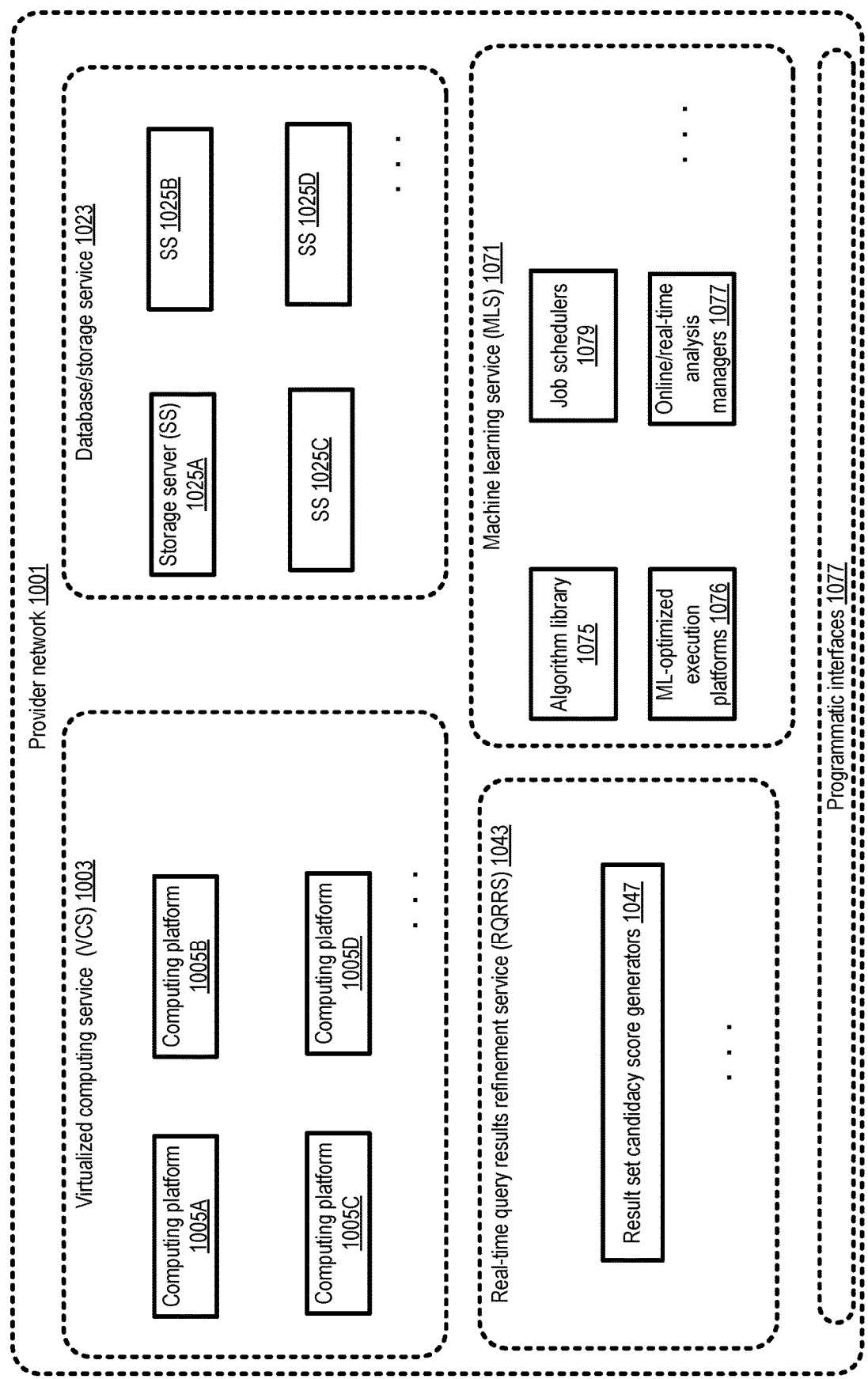
FIG. 10 illustrates a provider network environment at which a real-time query results refinement service may be implemented, according to at least some embodiments.

In some embodiments, the techniques discussed above for refining result sets for various types of queries may be implemented at a provider network. FIG. 10 illustrates a provider network environment at which a real-time query results refinement service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 1001 may comprise resources used to implement a plurality of services, including for example a virtual computing service (VCS) 1003, a database or storage service 1023, a machine learning service (MLS) 1071 and a real-time query results refinement service (RQRRS) 1043. In some embodiments, the RQRRS 1043 may be implemented as a subcomponent of the MLS 1071. Components of a given service may utilize components of other services in the depicted embodiment—e.g., for some machine learning tasks, a component of the machine learning service 1071 may utilize virtual machines implemented at computing platforms such as 1005A-1005D of the virtualized computing service. Input data, intermediate results, final results and/or other artifacts of various machine learning algorithms or models, such as those used for generating feature sets for item inventories and/or refining query result sets, may be stored at storage servers 1025 (e.g., 1025A-1025D) of the database or storage service 1023 in some embodiments. Individual ones of the services shown in FIG. 10 may implement a respective set of programmatic interfaces 1077 which can be used by external and/or internal clients (where the internal clients may comprise components of other services) in the depicted embodiment.

As shown, RQRRS 1043 may comprise, among other components, one or more result set candidacy score generators 1047 in the depicted embodiment. The score generators 1047 may, for example, invoke algorithms selected from the machine learning algorithm library 1075 in the depicted embodiment. In some embodiments, requests to train some types of machine learning models (such as feature extraction models) may be handled as batch jobs at the machine learning service, and a batch job scheduler 1079 may orchestrate the allocation of resources for the jobs as well as dependencies among jobs. In the depicted embodiment, online/real-time analysis managers 1077 of the MLS 1071 may be responsible for re-training and/or executing models from which results are needed within very short time intervals. In at least one embodiment, a machine learning service 1071 may have access to or include a set of execution platforms 1076 that are optimized for machine learning tasks (e.g., platforms that have customized hardware such as GPU arrays and/or customized software stacks). Depending on the suitability of such platforms for result set refinement-related tasks, one or more execution platforms 1076 may be employed for such tasks in the depicted embodiment.

In at least some embodiments, the techniques discussed for result set refinement may be accomplished using non-specialized computing platforms of the virtualized computing service 1003. In various embodiments, at least some of the training and test/evaluation data used for various models for result set refinement may be stored at a database/storage service 1023. The techniques for result set refinement described above may be implemented without acquiring resources of network-accessible services such as those shown in FIG. 10 in at least some embodiments. For example, a standalone tool implemented at one or more computing devices which are not part of a network-accessible service may be used in some embodiments.

Use Cases

The techniques described above, of refining results sets for various types of searches and other programmatic interactions in real time using feedback on visual representations of the result set members may be useful in a variety of scenarios. Many Internet-based retailing/wholesaling organizations may have very large inventories, running into tens of thousands of objects even within a fairly narrow category such as tables, rugs and the like. For some item categories for which purchase decisions are often based ultimately on subjective evaluations, based for example on looking at and comparing images of the objects, it may be hard for many potential item consumers to specify their requirements using precise-enough terms for search engines. Using feature sets which capture salient characteristics of item images, and machine learning models that can be very quickly re-trained with the help of a few feedback-based training examples, it may become possible for consumers to very quickly (e.g., within a few seconds of an interaction session with an e-retailer's web site using a convenient device such as a smart phone) find items that meet their needs.

Illustrative Computer System

Figure 11:
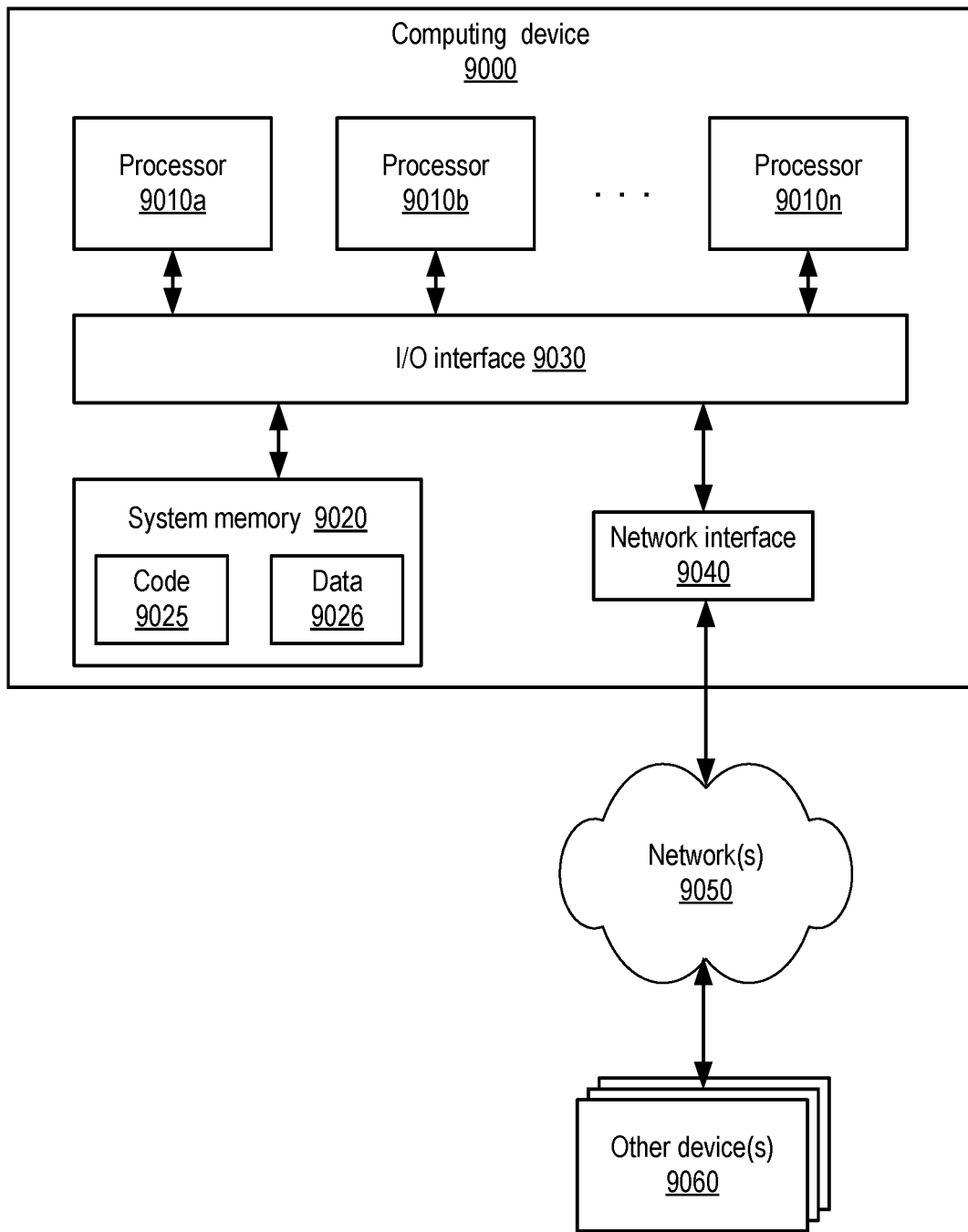
FIG. 11 is a block diagram illustrating an example computing device that may be used in at least some embodiments.

In at least some embodiments, a server that implements a portion or all of one or more of the technologies described herein, including the various components of a real-time result set refinement service such as feature set generators, result set candidacy score generators, to-be-scored item group selectors, item presentation managers, and the like may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices of an artificial intelligence service;
   wherein the one or more computing devices:
      generate, using at least a first machine learning model, a respective feature set corresponding to individual items of an item collection, wherein a particular feature set corresponding to a particular item is based at least in part on an image of the particular item;
      cause, in response to a query from an item consumer, wherein the query is received via a programmatic interface, respective images of one or more items of an initial result set of items to be displayed at a presentation device; and
      perform one or more real-time result refinement iterations, wherein a particular real-time result refinement iteration comprises:
         determining that the item consumer has generated one or more feedback signals with respect to one or more items whose images have been displayed at the presentation device;
         determining one or more metrics for the one or more feedback signals, wherein the one or more metrics include at least one of: a metric of explicitness of a particular feedback signal of the one or more feedback signals, a metric of a relative timing of the particular feedback signal with respect to another feedback signal, or a metric of a modality of the particular feedback signal;
         assigning a weight to the particular feedback signal, wherein the weight is based at least in part on the one or more metrics;
         training, using at least the one or more feedback signals and one or more feature sets of the respective feature sets, a second machine learning model to predict, with respect to individual ones of at least a subset of the items of the item collection, a respective query result candidacy metric, wherein the training of the first machine learning model comprises one or more computations based at least in part on the weight;
         identifying, based at least in part on their respective query result candidacy metrics, one or more additional items to be included in an updated query result set; and
         causing respective images of the one or more additional items to be transmitted to the presentation device.

2. The system as recited in claim 1, wherein the one or more real-time query result refinement iterations comprise a first real-time query result refinement iteration followed by a second real-time query result refinement iteration, wherein the one or more computing devices:

cause, as part of the second real-time query result refinement iteration, one or more additional items to be transmitted to the presentation device, before an indication of a feedback signal with respect to at least one additional item identified using the second machine learning model in the first real-time query result refinement iteration is received.

3. The system as recited in claim 1, wherein the second machine learning model comprises one or more of: (a) a logistic regression model or (b) a structured vector machine (SVM) model.

4. The system as recited in claim 1, wherein the first machine learning model comprises a deep neural network, and wherein the particular feature set comprises an embedding vector obtained from a hidden layer of the deep neural network.

5. The system as recited in claim 1, wherein the particular feature set corresponding to the particular item is based at least in part on values of one or more additional attributes of the particular item, wherein the one or more additional attributes comprise one or more of: (a) a title, (b) a description, (c) a category or (d) a price.

6. A method, comprising:
performing, by one or more computing devices:
causing, in response to a first programmatic interaction of an item consumer with a network-accessible entity providing access to a plurality of items of an item collection, respective images of one or more items of an initial result set of items to be displayed at a presentation device; and
implementing one or more result refinement iterations, wherein a particular result refinement iteration comprises:
determining that the item consumer has generated one or more feedback signals with respect to one or more items whose images have been displayed at the presentation device;
determining one or more metrics for the one or more feedback signals, wherein the one or more metrics include at least one of: a metric of explicitness of a particular feedback signal of the one or more feedback signals, a metric of a relative timing of the particular feedback signal with respect to another feedback signal, or a metric of a modality of the particular feedback signal;
assigning a weight to the particular feedback signal, wherein the weight is based at least in part on the one or more metrics;
training, using at least the one or more feedback signals, a first machine learning model to predict, with respect to individual ones of at least a subset of the items of the item collection, a respective result candidacy metric, wherein the training of the first machine learning model comprises one or more computations based at least in part on the weight; and
causing respective images of one or more additional items to be transmitted to the presentation device, wherein the one or more additional items are selected based at least in part on their respective result candidacy metrics.

7. The method as recited in claim 6, further comprising performing, by the one or more computing devices:
generating, using at least a second machine learning model, a respective feature set corresponding to individual items of the item collection, wherein a particular feature set corresponding to a particular item is based at least in part on an image of the particular item, and wherein the training set of the first machine learning model comprises respective feature sets of the subset of the items.

8. The method as recited in claim 7, wherein the second machine learning model comprises one or more of: (a) a neural network model, (b) a principal component analysis (PCA) model, (c) a canonical correlation analysis (CCA) model, or (d) a supervised matrix factorization model.

9. The method as recited in claim 7, wherein the particular feature set corresponding to the particular item is based at least in part on values of one or more additional attributes of the particular item, wherein the one or more additional attributes comprise one or more of: (a) a title, (b) a description, (c) a category or (d) a price.

10. The method as recited in claim 6, further comprising performing, by the one or more computing devices:
modifying, based at least in part on feedback received from one or more entities, the particular feature set corresponding to the particular item.

11. The method as recited in claim 6, wherein a respective metadata entry associated with individual items of the item collection comprises an indication of an item category, the method further comprising:
identifying one or more target item categories, based at least in part on the first programmatic interaction; and
including, in the subset of items for which respective result set candidacy metrics are to be generated in a particular real-time result refinement iteration, one or more items of the one or more target categories.

12. The method as recited in claim 6, wherein, in a particular iteration of the one or more result refinement iterations, a result candidacy metric is generated for at least one item for which a result candidacy metric was not generated in a previous iteration.

13. The method as recited in claim 6, wherein the particular iteration of the one or more result refinement iterations comprising performing, by the one or more computing devices:
obtaining, based at least in part on the one or more feedback signals, pairwise preference indicators with respect to one or more pairs of the items whose images have been displayed, wherein the training of the first machine learning model comprises analyzing the pairwise preference indicators.

14. The method as recited in claim 6, wherein determining one or more metrics for the one or more feedback signals comprises determining the metric of explicitness of the particular feedback signal; and
wherein the weight is based at least in part on the metric of explicitness.

15. The method as recited in claim 6, wherein determining one or more metrics for the one or more feedback signals comprises determining the metric of a relative timing of the particular feedback signal with respect to another feedback signal; and
wherein the weight is based at least in part on the metric of the relative timing.

16. A non-transitory computer-accessible storage medium storing program instructions that when executed on one or more processors cause the one or more processors to:

cause, in response to a first programmatic interaction, respective representations of one or more items of an initial result set of items to be presented to an item consumer via a particular device; and perform one or more result refinement iterations, wherein a particular result refinement iteration comprises:

identify one or more feedback indicators with respect to one or more items whose representations have been presented;

determine one or more metrics for the one or more feedback indicators, wherein the one or more metrics include at least one of: a metric of explicitness of a particular feedback indicator of the one or more feedback indicator, a metric of a relative timing of the particular feedback indicator with respect to another feedback indicator, or a metric of a modality of the particular feedback indicator;

assign a weight to the particular feedback indicator, wherein the weight is based at least in part on the one or more metrics;

train, using at least the one or more feedback indicators, a first machine learning model to predict, with respect to individual ones of at least a subset of the items of the item collection, a respective result candidacy metric, wherein the training of the first machine learning model comprises one or more computations based at least in part on the weight; and cause respective representations of one or more additional items to be transmitted to the particular device, wherein the one or more additional items are selected based at least in part on their respective result candidacy metrics.

17. The non-transitory computer-accessible storage medium as recited in claim 16, wherein the instructions when executed on one or more processors cause the one or more processors to:

generate, using at least a second machine learning model, a respective feature set corresponding to individual items of the item collection, wherein a particular feature set corresponding to a particular item is based at least in part on an image of the particular item, and wherein the training set of the first machine learning model comprises respective feature sets of the subset of the items.

18. The non-transitory computer-accessible storage medium as recited in claim 16, wherein in a first result refinement iteration of the one or more result refinement iterations, a particular feedback indicator of the one or more feedback indicators comprises an utterance, wherein the instructions when executed on one or more processors cause the one or more processors to:

generate an embedding feature vector corresponding to at least a portion of the utterance; and provide the embedding feature vector as input to the first machine learning model.

19. The non-transitory computer-accessible storage medium as recited in claim 16, wherein the instructions when executed on one or more processors cause the one or more processors to:

tune one or more hyper-parameters of the first machine learning model using a reinforcement learning algorithm, wherein a reward function used in the reinforcement learning algorithm is based at least in part on a metric of one or more actions taken by the item consumer in response to the one or more result refinement iterations.

20. The non-transitory computer-accessible storage medium as recited in claim 16, wherein the particular device comprises one or more of: (a) a phone, (b) a tablet computing device, (c) a laptop computer, (d) a desktop computer, (e) an augmented reality device, (f) a virtual reality device, (g) a voice-drive personal assistant device or (h) a wearable computing device.

* * * * *